US012716017B2

(12) United States Patent
Nam et al.

(10) Patent No.: US 12,716,017 B2
(45) Date of Patent: Aug. 25, 2026

(54) SELF-HEALING METAL-LIGAND POLYMERIC MATERIALS

(71) Applicant: THE REGENTS OF THE UNIVERSITY OF MICHIGAN, Ann Arbor, MI (US)

(72) Inventors: Sunghyun Nam, Ann Arbor, MI (US); Lingjie Jay Guo, Ann Arbor, MI (US)

(73) Assignee: The Regents of The University of Michigan, Ann Arbor, MI (US)

(*) Notice: Subject to any disclaimer, the term of this patent is extended or adjusted under 35 U.S.C. 154(b) by 1163 days.

(21) Appl. No.: 17/766,132

(22) PCT Filed: Oct. 2, 2020

(86) PCT No.: PCT/US2020/054077
§ 371 (c)(1),
(2) Date: Apr. 1, 2022

(87) PCT Pub. No.: WO2021/067811
PCT Pub. Date: Apr. 8, 2021

(65) Prior Publication Data

US 2022/0340792 A1 Oct. 27, 2022

Related U.S. Application Data

(60) Provisional application No. 62/910,972, filed on Oct. 4, 2019.

(51) Int. Cl.
*C09J 129/04* (2006.01)
*C08L 29/04* (2006.01)
(Continued)

(52) U.S. Cl.
CPC ............ *C09J 129/04* (2013.01); *C08L 29/04* (2013.01); *C09J 9/00* (2013.01); *C09J 11/04* (2013.01)

(58) Field of Classification Search
CPC .. C09J 129/04; C09J 9/00; C09J 11/04; C08L 29/04
See application file for complete search history.

(56) References Cited

U.S. PATENT DOCUMENTS 4,442,258 A 4/1984 Sunakawa et al.
4,750,482 A 6/1988 Sieverding
(Continued)

FOREIGN PATENT DOCUMENTS

CN 109971000 A 7/2019
JP 2007031601 A * 2/2007
WO WO-2019/138077 A1 7/2019

OTHER PUBLICATIONS

Hassan et al ("Structure and Applications of Poly(vinyl alcohol) Hydrogels Produced by Conventional Crosslinking or by Freezing/Thawing Methods", Advances in Polymer Science, vol. 153, 2000). (Year: 2000).*

(Continued)

*Primary Examiner* — Jiangtian Xu
(74) *Attorney, Agent, or Firm* — Harness, Dickey & Pierce, P.L.C.

(57) ABSTRACT

In various aspects, a self-healing polymeric material is provided, as well as methods of making a self-healing material. The self-healing material may include a polymer network defining one or more ligands having a metal ion coordination site. The polymer network may be a poly(vinyl alcohol) (PVA) hydrogel and the metal ion may be a transition metal, like zinc. The metal ion is distributed in the polymer network and capable of interacting with the at least one metal ion coordination site via a reversible coordination bond. The polymer network is capable of self-healing a mechanical crack or cut in less than or equal to about 30 minutes at ambient conditions and in certain variations, in as
(Continued)

little as 5-10 seconds. The self-healing polymeric materials can be used to form pressure sensitive adhesives.

19 Claims, 27 Drawing Sheets

(51) Int. Cl.
*C09J 9/00* (2006.01)
*C09J 11/04* (2006.01)

(56) References Cited

U.S. PATENT DOCUMENTS

| | | | |
|---|---|---|---|
| 5,308,887 | A | 5/1994 | Ko et al. |
| 5,904,974 | A | 5/1999 | Hanada et al. |
| 6,680,082 | B2 | 1/2004 | Chou et al. |
| 7,462,390 | B2 | 12/2008 | Kim et al. |
| 7,887,914 | B2 | 2/2011 | Kobayashi et al. |
| 8,633,293 | B2 | 1/2014 | Rousseau |
| 9,346,931 | B2 | 5/2016 | Odriozola et al. |
| 10,160,835 | B2 | 12/2018 | Wang et al. |
| 2014/0148555 | A1 | 5/2014 | Mruk et al. |
| 2014/0329267 | A1 | 11/2014 | Odriozola et al. |
| 2015/0225438 | A1 | 8/2015 | Johnson et al. |
| 2016/0152638 | A1 | 6/2016 | Chen et al. |
| 2017/0174842 | A1 | 6/2017 | Wang et al. |

OTHER PUBLICATIONS

Third Office Action for CN Application No. 202080084291.0 issued Mar. 31, 2025; 9 pages.
Tupy, Michael et al., "Effect of Water and Acid-Base Reactants on Adhesive Properties of Various Plasticized Poly (vinyl butyral) Sheets," Journal of Applied Polymer Science (2013), pp. 3474-3484; (Published online May 22, 2012) DOI: 10.1002/APP.37597.
Mozhdehi, Davoud et al., "Self-Healing Multiphase Polymers via Dynamic Metal-Ligand Interactions," Journal of the American Chemical Society (2014) 136, 46; (Published: Oct. 28, 2014) DOI: 10.1021/ja5097094.
Rao, Ying-Li et a. "Stretchable Self-Healing Polymeric Dielectrics Cross-Linked Through Metal-Ligand Coordination," J. Am. Chem. Soc. (2016), 138, 18, pp. 6020-6027; (Published Apr. 21, 2016) DOI: 10.1021/jacs.6b02428.
Zhang, Hongji et al., "Poly(vinyl alcohol) Hydrogel Can Autonomously Self-Heal," ACS MAcro Lett (2012), 1, 11, pp. 1233-1236; (Published Oct. 9, 2012) DOI: 10.1021/mz300451r.
Adams, M et al., "Friction and lubrication of human skin," Tribology Letters (2007) 26, pp. 239-253; (Published Mar. 15, 2007) DOI: 10.1007/s11249-007-9206-0.
Pailler-Matté, C. et al., "Analysis of adhesive behaviour of human skin in vivo by an indentation test," Tribology International, 39 (2006), pp. 12-21; (Published online Jan. 13, 2005) DOI: 10.1016/j.triboint.2004.11.003.
Fujii, S. et al., "Pressure-sensitive adhesive powder," Mater. Horiz. (2016) 3, pp. 47-52; (Published Oct. 5, 2015) DOI: 10.1039/c5mh00203f).
Lee, Sung Ho et al., "Scalable and continuous fabrication of bio-inspired dry adhesives with a thermosetting polymer," Soft Matter (2018), 14, pp. 2586-2593; (Published Jan. 29, 2018) DOI: 10.1039/c7sm02354e.
Hassan, Christe M., "Structure and Applications of Poly(vinyl alcohol) Hydrogels Produced by Conventional Crosslinking or by Freezing/Thawing Methods, " Biopolymers • PVA Hydrogels, Anionic Polymerisation Nanocomposites: Advances in Polymer Science, vol. 153. Springer, Berlin, Heidelberg; (Published online: Oct. 20, 2000) DOI: 10.1007/3-540-46414-X_2.
Cho, Soo Hyoun et al., "Self-Healing Polymer Coatings," Advanced Materials, 21 (6), pp. 645-649; (Published online Jan. 21, 2009) DOI: 10.1002/adma.200802008.
Second Office Action for CN Application No. 202080084291.0 issued Dec. 27, 2024; 5 pages.
International Search Report and Written Opinion of the International Searching Authority issued in PCT/US2020/054077, mailed Feb. 9, 2021; ISA/US.
First Office Action for CN Application No. 202080084291.0 issued Mar. 29, 2024.
Nam, Sunghyun; "Engineering of Self-healing adhesives and Polymeric Sensors with Stretchable Applications"; Macromolecular science and Engineering in the University of Michigan, accessioned 2020; 246 pages.

* cited by examiner

Cutting

Attaching again

Without any external stimuli (heat, light, chemicals, etc.) At room temperature

Stretching

Adhesion using SHA at RT for 5 min

Filled with liquid 15 days later 25.4
W
grip area
63.5
L
12.7
25.4
shear area
grip area
127 + L mm
177.8 + L mm

ASTM D1002

SELF-HEALING METAL-LIGAND POLYMERIC MATERIALS

CROSS-REFERENCE TO RELATED APPLICATION

This application is a 371 U.S. National Phase of International Application PCT/US2020/054077, filed on Oct. 2, 2020, which claims the benefit of U.S. Provisional Application No. 62/910,972, filed on Oct. 4, 2019. The entire disclosures of the above applications are incorporated herein by reference.

FIELD

The present disclosure relates to self-healing polymeric materials capable of self-healing at ambient conditions having metal-ligand complexes.

BACKGROUND

This section provides background information related to the present disclosure which is not necessarily prior art.

Self-healing is generally understood to be the ability of a material to recover itself upon damage, such as mechanical damage. Self-healing materials can improve the lifetime, recyclability, durability, energy efficiency, and safety of synthetic materials. For example, autonomous self-healing materials are capable of repairing themselves when mechanically damaged or chemically corroded. Certain self-healing materials react in situ to heal. Synthetic materials with self-healing properties are highly desirable for a variety of applications, including self-healing adhesives, self-healing sensors, self-healing coatings, and the like that can be used in a variety of applications, including electronic devices, medical devices, and the like. A variety of self-healing strategies have been studied for polymer systems. For example, in certain techniques, reagents or catalysts for a self-healing material may be distributed within a polymeric matrix, ready for reaction when localized damage occurs. Conventionally, self-healing polymers employ hydrogen bonds, dynamic covalent bonds, ion-dipole interactions), disulfide bonds, liquid metal interactions and even the incorporation of healing agents as the healing motifs. Autonomous self-healing materials capable of repeatable self-healing ability at ambient conditions, along with extended environmental stability, are highly desirable.

SUMMARY

This section provides a general summary of the disclosure, and is not a comprehensive disclosure of its full scope or all of its features.

In certain aspects the present disclosure relates to a self-healing polymeric material comprising a polymer network comprising poly(vinyl alcohol) (PVA) that defines one or more ligands having a transition metal ion coordination site. The self-healing polymeric material has a transition metal ion distributed in the polymer network. The transition metal ion is capable of interacting with the transition metal ion coordination site via a reversible coordination bond. Thus, the polymer network is capable of self-healing a mechanical crack or cut in less than or equal to about 30 minutes at ambient conditions.

In one aspect, the transition metal ion is a zinc ion ($Zn^{2+}$).

In one aspect, the polymer network is capable of self-healing a mechanical crack or cut in less than or equal to about 1 minute at ambient conditions.

In one aspect, the polymer network further comprises an additive selected from the group consisting of: a plasticizer, a crosslinker, a nanoparticle, and combinations thereof.

In one aspect, the polymer network is a hydrogel.

In one aspect, a ratio of moles of PVA ($N_{PVA}$) to moles of zinc ions ($N_{zn}$) is greater than or equal to about 20:1 to less than or equal to about 10:5.

In one aspect, the self-healing polymeric material further comprises water, a first complex of the transition metal ion and the transition metal ion coordination site, and a second complex of the transition metal ion and water. A ratio of the first complex to the second complex may be greater than or equal to about 1:1 and less than or equal to about 5:1.

In one aspect, the self-healing polymeric material is capable of an elongation under strain of greater than or equal to about 100% after self-healing of the mechanical crack or cut.

In one aspect, the self-healing polymeric material has a transmissivity of greater than or equal to about 70% for electromagnetic radiation wavelengths of greater than or equal to about 380 nm to less than or equal to about 780 nm.

In one aspect, the self-healing polymeric material has a sheet resistance of less than or equal to about 10 MΩ/square.

In one aspect, a self-healing pressure sensitive adhesive formed of the self-healing polymeric material as described above is provided. The self-healing pressure sensitive adhesive is capable of adhering to at least one substrate selected from the group consisting of:

glass, plastic, metal, fabric, and biological tissue.

In one further aspect, the self-healing pressure sensitive adhesive has a bond strength with the at least one substrate of greater than or equal to about 0.05 MPa without any preload and 0.15 MPa with a preload level of 1.5 MPa.

In one further aspect, the self-healing pressure sensitive adhesive is water-resistant and solvent-resistant.

In one further aspect, the self-healing pressure sensitive adhesive has a maximum shear strength of greater than or equal to about 100 kPa.

In one aspect, a device incorporating the self-healing polymeric material as described above is provided. The device may be selected from the group consisting of: an electronic device, a display, a wearable device, a vehicle, a robot, manufacturing equipment, construction equipment, a medical device, packaging, a toy, a sensor, and an energy conversion or storage device.

In certain other aspects the present disclosure relates to a self-healing polymeric material comprising a polymer network comprising one or more ligands having a transition metal ion coordination site and a transition metal ion distributed in the polymer network and capable of interacting with the transition metal ion coordination site via a coordination bond. The self-healing material satisfied the following conditions:

$$E_a = a \cdot f + b; \text{ and } a = \left(\frac{\partial E_a}{\partial f}\right) < 0,$$

where $E_a$ is an activation energy, f is a molar ratio of number of moles of transition metal ion to moles of ligands, a is a slope of activation energy versus the molar ratio that ranges from greater than or equal to about 1 to less than or equal to about 5, b is a y-intercept of activation energy versus the molar ratio of metal-ligand. The polymer network is capable of self-healing a mechanical crack or cut in less than or equal to about 30 minutes at ambient conditions.

In one aspect, the self-healing polymeric material has a Young's modulus represented by:

$$E = A \cdot \exp(-Bf),\ 11 < -B\left(= -\frac{\partial(\log E)}{\partial f}\right) < 20, \text{ and } A > 1,$$

where E is the Young's modulus and f is a ratio of moles of transition metal ion to moles of ligands of the polymer network.

In one aspect, the self-healing polymeric material has a Young's modulus (E) of greater than or equal to about 0.01 kPa to less than or equal to 100 kPa.

In one aspect, the self-healing polymeric material is cross-linked and has a Young's modulus of greater than or equal to about 1 kPa to less than or equal to 100 MPa.

In one aspect, a self-healing pressure sensitive adhesive formed of the self-healing polymeric material described above may have a total adhesive strength ($\sigma_A$) of the self-healing pressure sensitive adhesive represented by:

$$\sigma_A = \sigma_A^0 + \sigma_{A,P}^0\left(1 - \exp\left[-\frac{P}{\tau}\right]\right),$$

where $\sigma^0_A$ is a normal adhesive strength of the self-healing pressure sensitive adhesive without any preload, $\sigma^0_{A,P}$ is a saturation value of normal adhesive strength of the self-healing pressure sensitive adhesive with a preload, P is a preload applied to the self-healing pressure sensitive adhesive, and $\tau$ is a relaxation value adhesive strength with the preload, wherein r is greater than or equal to about 0.1 and less than or equal to about 1.

In one aspect, the self-healing pressure sensitive adhesive may have a ratio of $\tau$ after self-healing to an original $\tau$ before any damage is represented by the following:

$$\frac{\tau_{self-healed}}{\tau_{original}} < 0.2,$$

where $\tau_{original}$ is a relaxation strength before damage and $\tau_{self-healed}$ is a relaxation strength after self-healing.

In one aspect, the self-healing pressure sensitive adhesive may have a total adhesive strength ($\sigma_A$) of the self-healing pressure sensitive adhesive is greater than or equal to about 0.1 MPa to less than or equal to about 5 MPa.

In one further aspect, the self-healing pressure sensitive adhesive has ionomeric properties represented by the following:

$$R^{-1} = R_0^{-1}(f - f_C)^r,$$

where $R^{-1}$ is an inverse of measured electrical resistance, $R^{-1}_0$ is a maximum value of an inverse of electrical resistance for self-healing adhesive, f is a ratio of moles of transition metal ion to moles of ligands of the polymer network, $f_c$ is a percolation threshold and is greater than 0 and less than or equal to about 0.1, and r is a critical exponent that is greater than or equal to about 1 to less than or equal to about 2.

In yet other aspects, the present disclosure relates to a method of making a self-healing polymeric material. The method may comprise mixing a polymer precursor and a precursor comprising a transition metal together to form a mixture of a polymer having one or more ligands with at least one transition metal ion coordination site and a transition metal ion distributed in the polymer. Next, the method comprises freezing the mixture followed by thawing the mixture. This forms a self-healing material comprising a polymer network having the transition metal ion distributed therein. At least one transition metal ion coordination site on one or more ligands of the polymer network reacts with the transition metal to form a reversible coordination bond. The self-healing material is capable of self-healing a mechanical crack or cut in less than or equal to about 30 minutes at ambient conditions in an absence of external stimuli.

In one aspect, at least three cycles of the freezing and thawing are conducted.

In one aspect, the method further comprises conducting a water removal process on the self-healing material after thawing. An activation energy of the self-healing material is controlled by an amount of water removed in the water removal process.

In one aspect, the method further comprises subjecting the self-healing material to a temperature of greater than or equal to about 30° C. to less than or equal to about 60° C. after the thawing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 shows the visual observation of features for self-healing polymers in terms of respective amounts of a transition metal ion, here zinc, and a ligand of poly(vinyl alcohol) (PVA). More specifically, self-healing hydrogels based on Zn-PVA complexes via freezing-thawing process over 3 cycles are shown.

FIGS. 2A-2B illustrate two types of complexes existing within a self-healing polymeric material prepared in accordance with the present disclosure. FIG. 2A shows a zinc-poly(vinyl alcohol) (PVA) ligand complex that facilitates self-healing bonds in the polymeric material. FIG. 2B on the other hand is a zinc-water complex that appears to inhibit self-healing.

Figure 6:
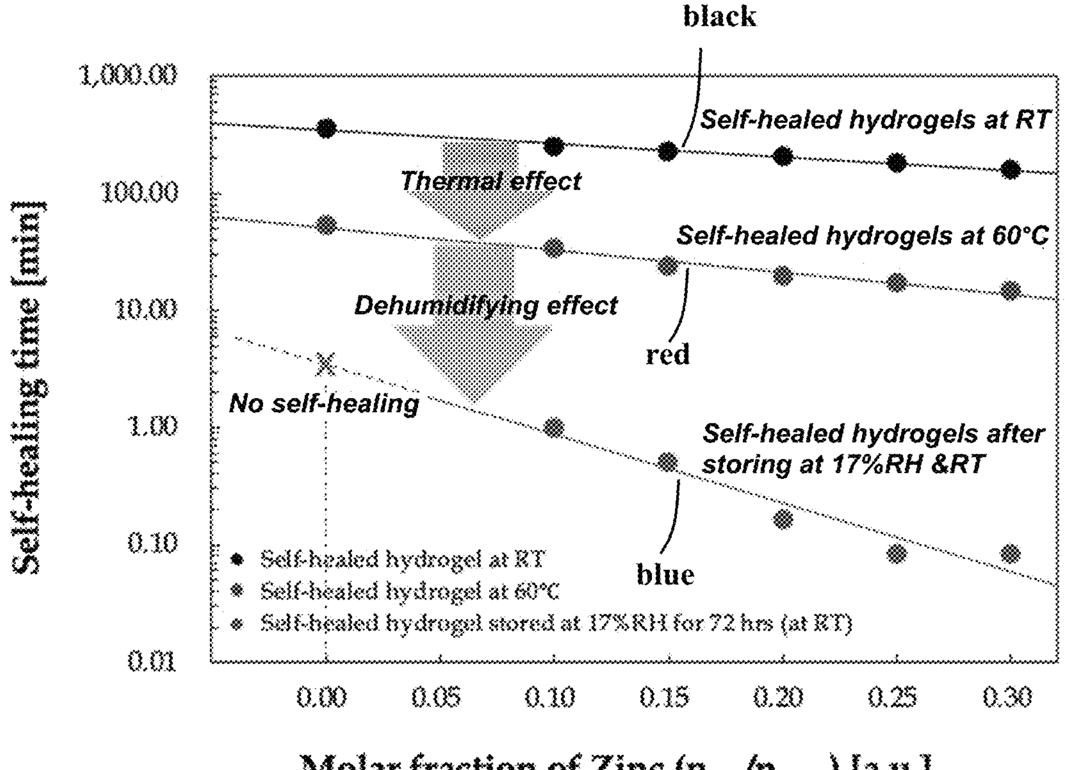

FIG. 6 shows comparative self-healing times for polymers prepared in accordance with certain variations of the present disclosure. Black circles show a self-healing polymer samples comprising poly(vinyl alcohol) (PVA) and zinc (Zn) formed from 3 cycles of a freezing-thawing process. Red circles show PVA/Zn self-healing polymer samples undergoing 3 cycles of a freezing-thawing process followed by subsequent heating at 60° C. PVA/Zn self-healing polymer samples formed by the same freeze-thaw processes, followed by the dehumidification process in the desiccator set to 22° C. and 17% RH for 72 hours are shown as blue circles.

Figure 7:
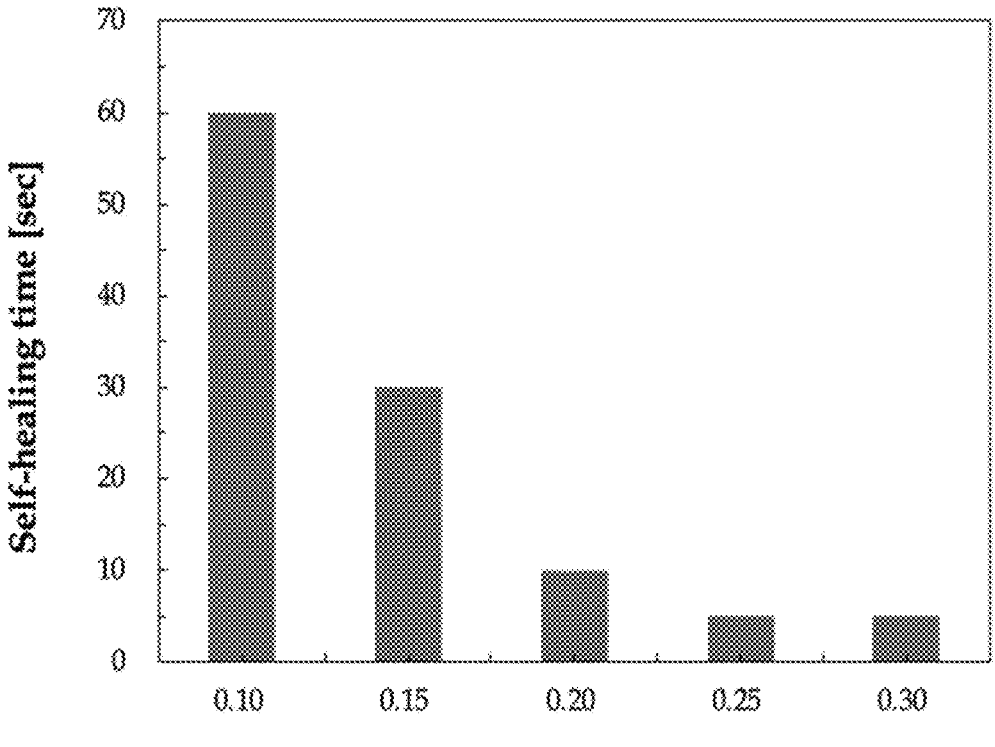

FIG. 7 shows self-healing time of self-healing PVA and Zn polymers fabricated by the freezing-thawing process of 3 cycles followed by the dehumidification process in a desiccator set to 22° C. and 17% RH for 72 hours in accordance with certain aspects of the present disclosure.

Figure 8:
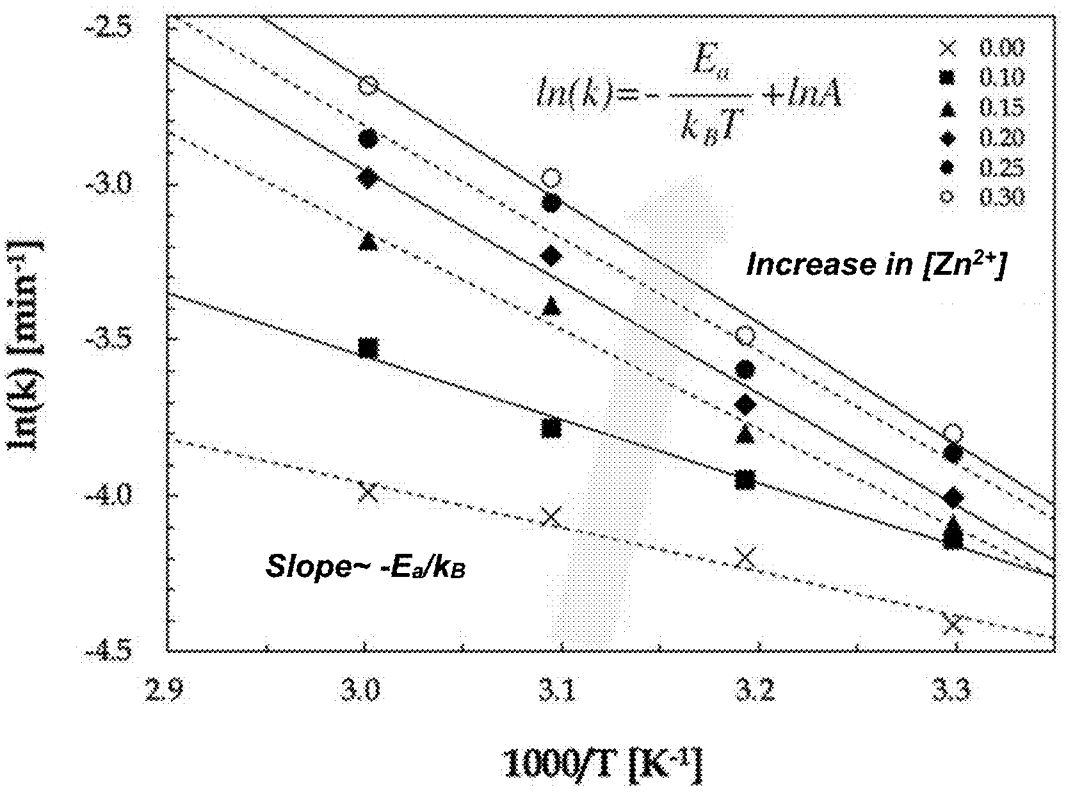

FIG. 8 shows an Arrhenius plot of ln (k) versus 1000/T to show a self-healing rate constant which is inversely proportional to the absolute temperature for the self-healing polymers fabricated by the freezing-thawing process of 3 cycles without the dehumidification process.

Figure 9:
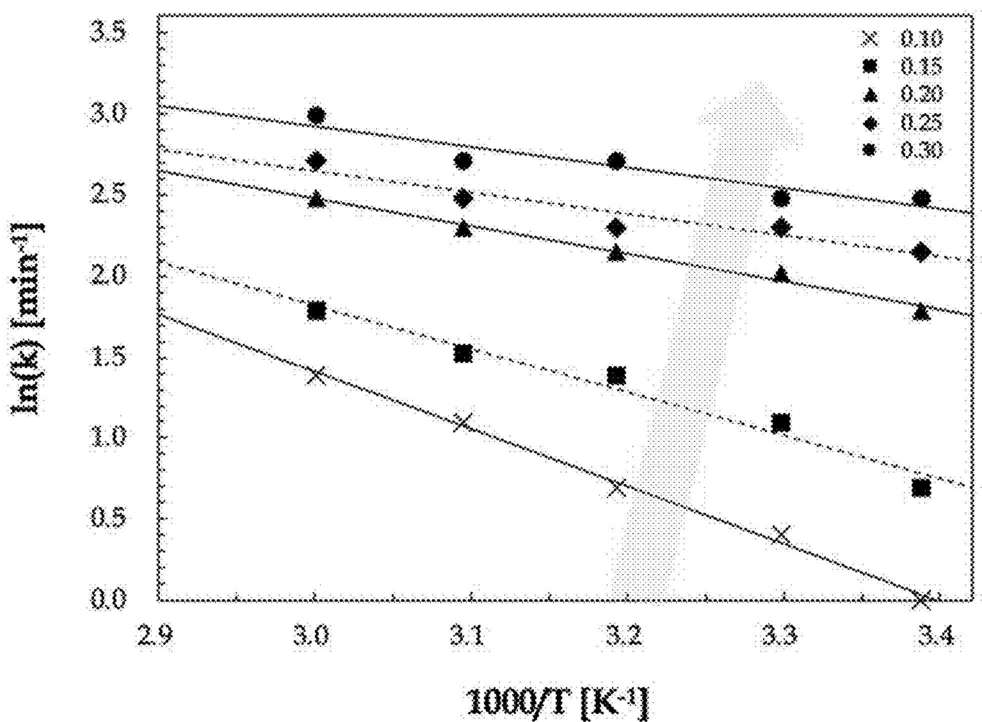

FIG. 9 shows an Arrhenius plot of ln (k) versus 1000/T to show a self-healing rate constant which is inversely proportional to the absolute temperature for the self-healing polymers fabricated by the freezing-thawing process of 3 cycles followed by the dehumidification process in the desiccator set to 22° C. and 17% relative humidity (RH) for 72 hours.

Figure 10:
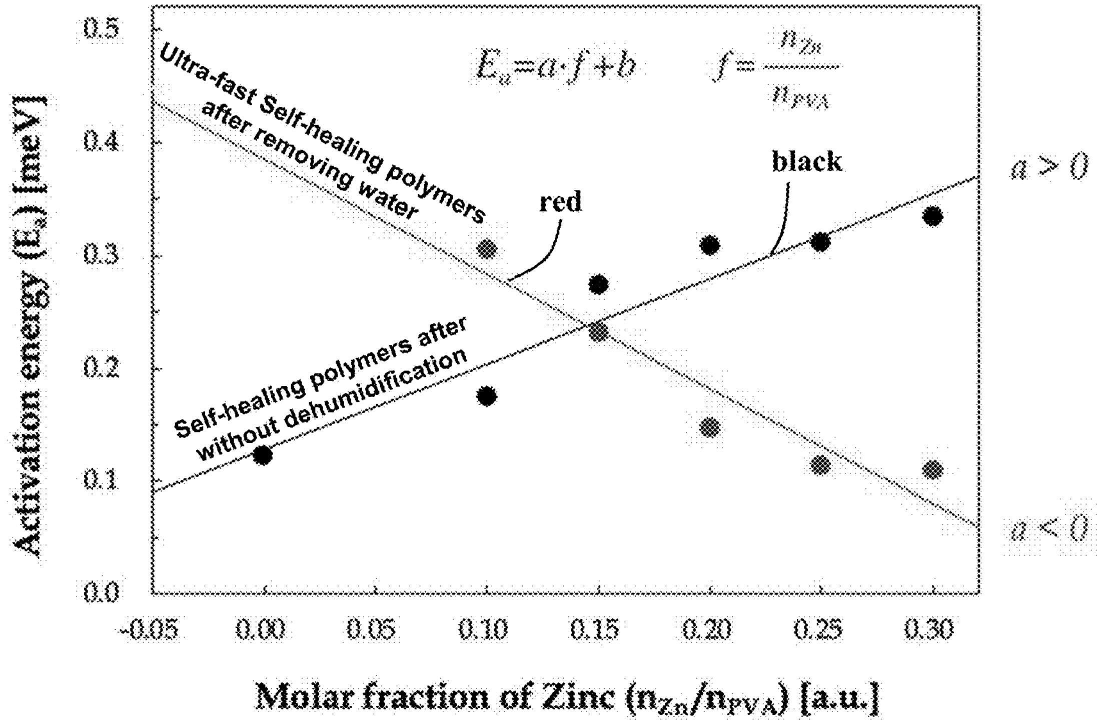

FIG. 10 shows activation energy ($E_a$) of self-healing polymers fabricated by the freezing-thawing process of 3 cycles (black circles) and the same processes followed by the dehumidification process in the desiccator set to 22° C. and 17% RH for 72 hours (red circles) according to certain aspects of the present disclosure.

Figure 11:
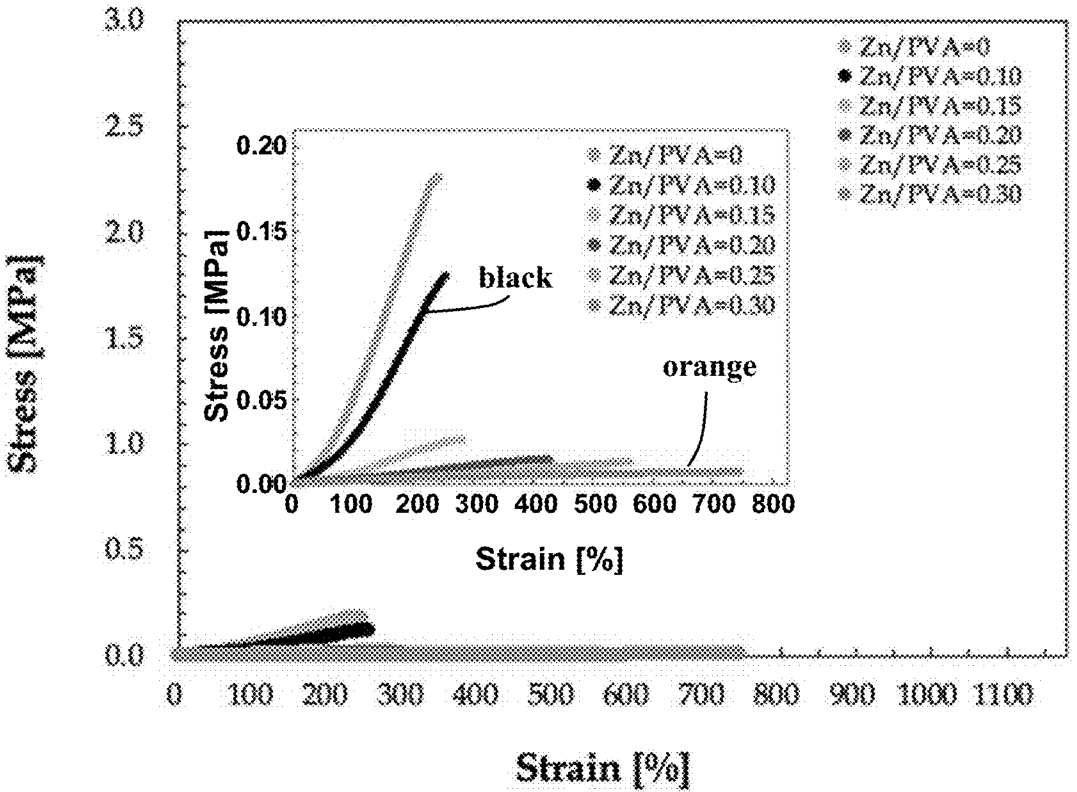

FIG. 11 shows stress-strain curves of the self-healing polymers based on the coordination bond of Zn-PVA via the freezing-thawing process of 3 cycles without the dehumidification process. (The inset indicates an enlarged view over y-axis for the same results.)

Figure 12:
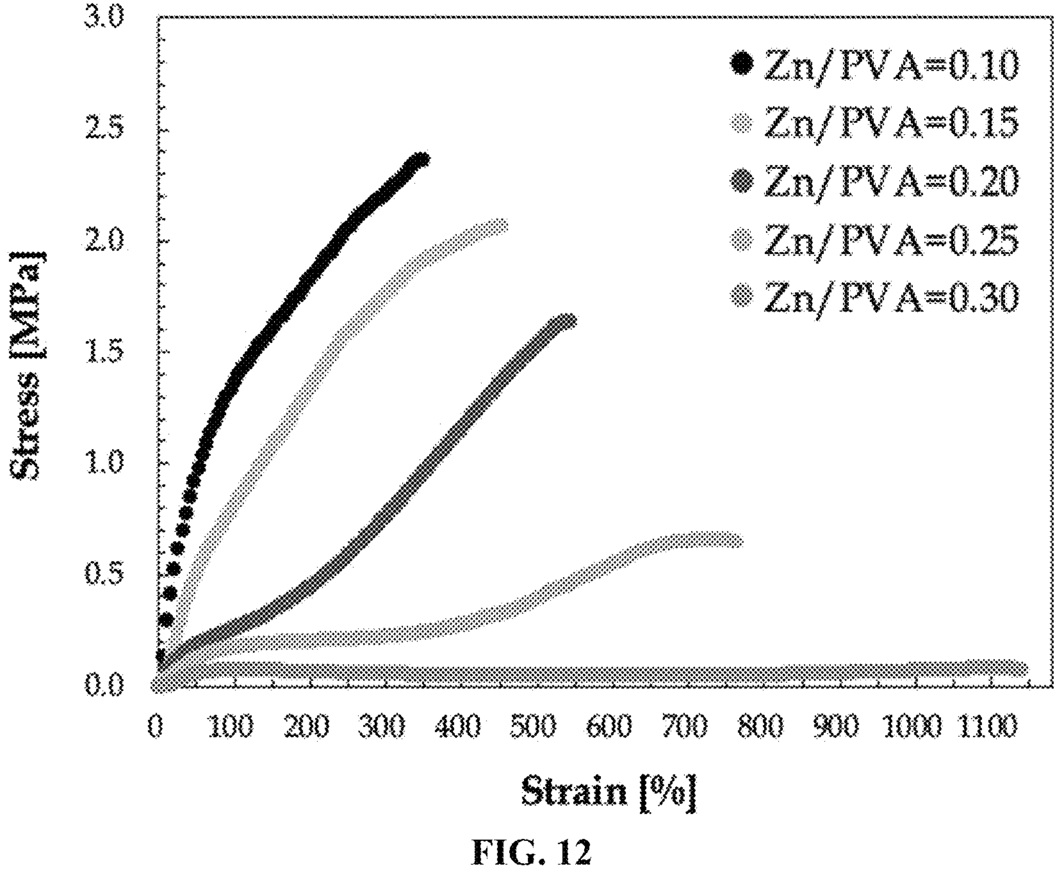

FIG. 12 shows stress-strain curves of the self-healing polymers based on the coordination bond of Zn-PVA via the freezing-thawing process of 3 cycles followed by the dehumidification process.

Figure 13:
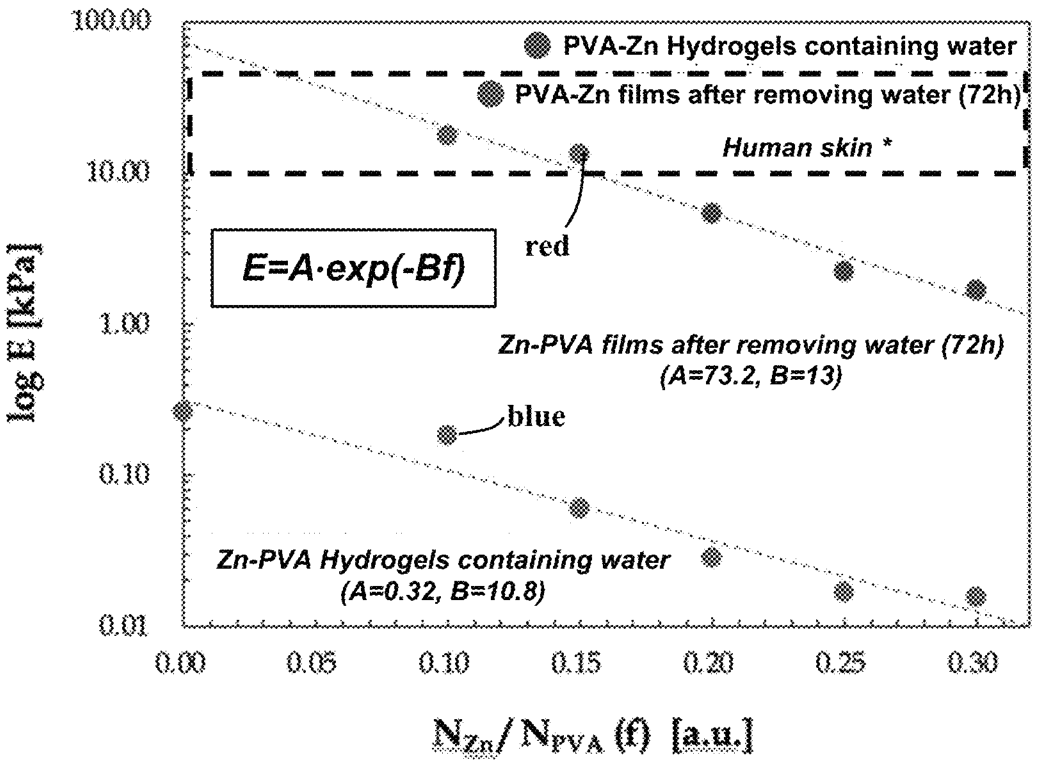

FIG. 13 shows a Young's modulus (E) of self-healing polymers based on Zn-PVA complexes subjected to a freezing-thawing process of 3 cycles prepared in accordance with certain aspects of the present disclosure. The blue and red circles indicate a measured moduli of self-healing polymers in terms of molar fractions between zinc ions ($Zn^{2+}$) and PVA before and after dehumidifying in the desiccator (22° C. and 17% RH) for 72 hours, respectively. All data are fitted by blue and red dot lines by the equation inset in the FIG. 9. The yellow box shows the modulus range of human skin surveyed from references.

Figure 14:
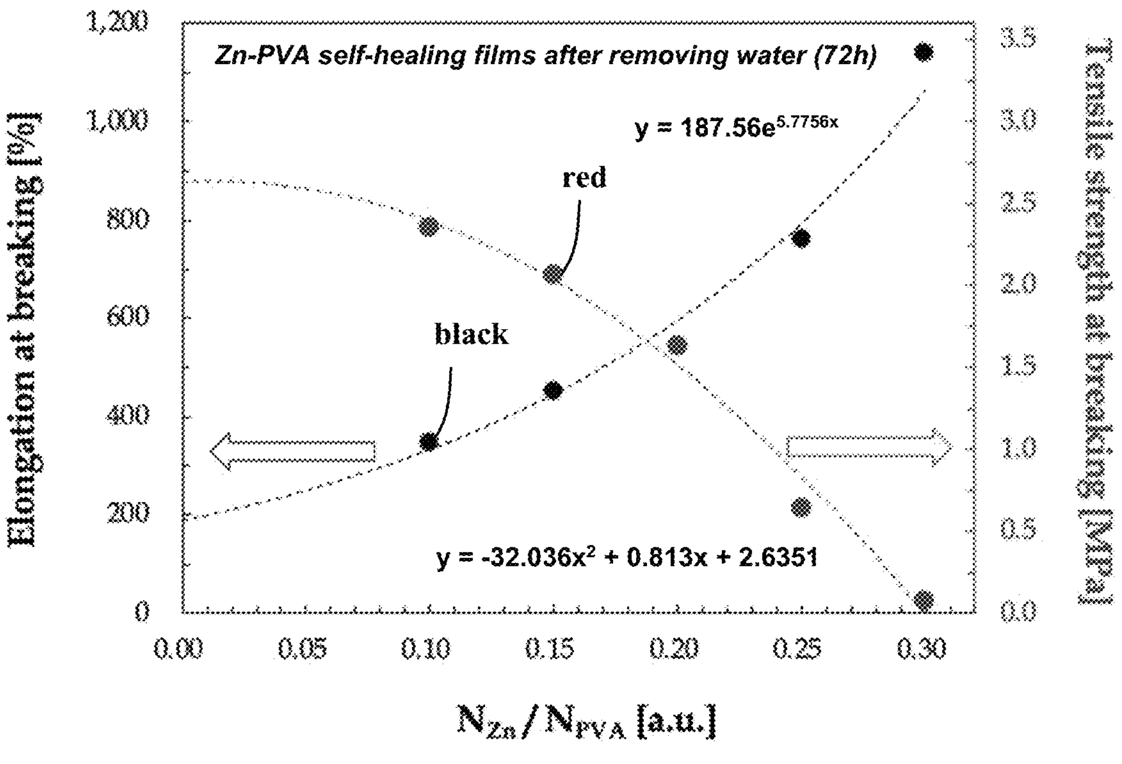

FIG. 14 shows measured elongation and tensile strength showing the brittle-ductile transitions of self-healing polymers prepared in accordance with certain aspects of the present disclosure with respect to the molar fractions of $Zn^{2+}$ and PVA. All samples based on Zn-PVA complexes are fabricated by the freezing-thawing process of 3 cycles followed by the dehumidification under 22° C. and 17% RH for 72 hours. Red shows tensile strength at breaking, while black shows elongation at breaking.

Figure 15:
Figure 15:
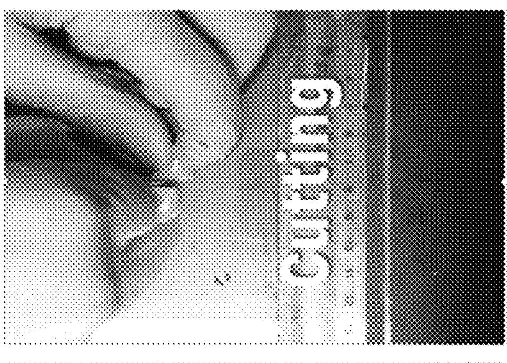
Figure 15:
Figure 15:
Figure 15:
Figure 15:
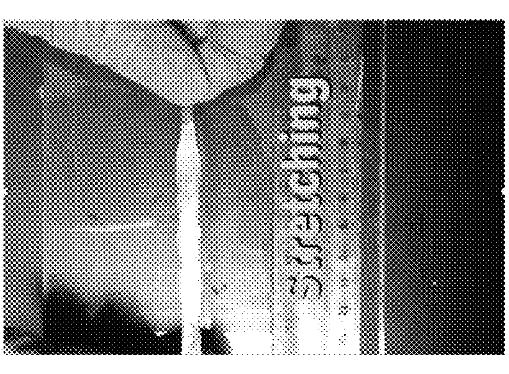

FIG. 15 shows a series of photographs where the self-healing polymeric material comprising PVA and Zn is cut, reattached with slight application of pressure at ambient conditions, where a self-healing time is less than 10 seconds, followed by stretching, where the healed polymer remains intact.

Figure 16:
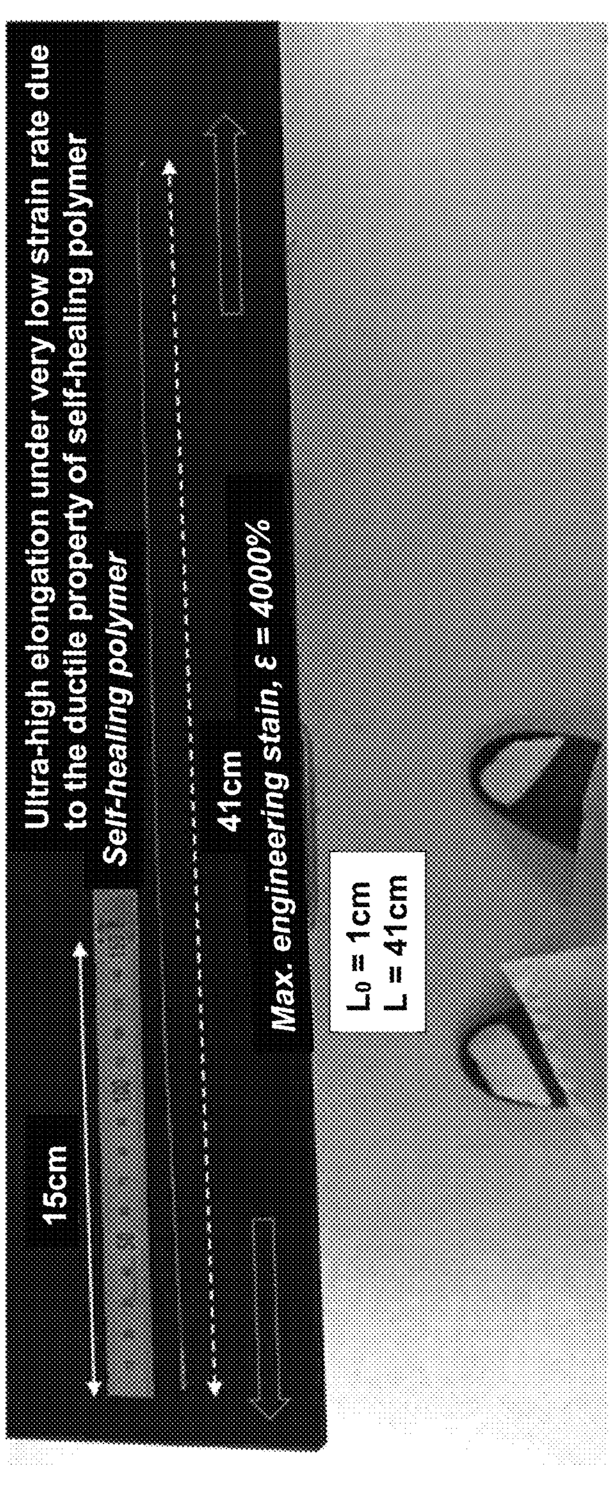

FIG. 16 is a photograph of a self-healing polymeric system comprising PVA and Zn that demonstrates ultra-high elongation (approximately 4000%) under a low strain rate of 10 mm/min.

Figure 17:
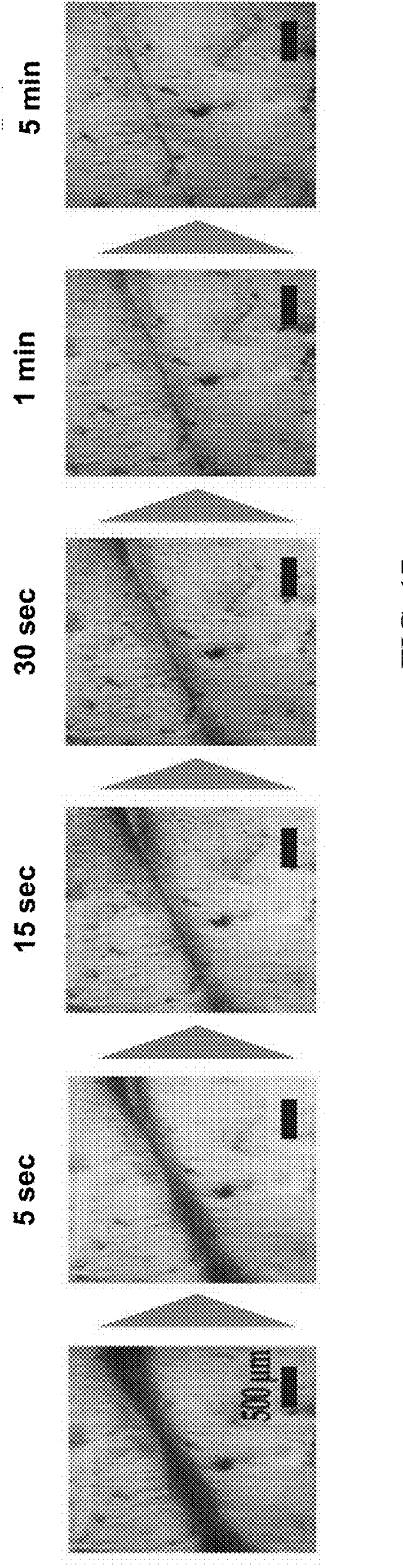

FIG. 17 shows photographs of an anti-scratching test of a self-healing polymer system prepared in accordance with certain aspects of the present disclosure at 0 seconds and after 5 seconds, 15 seconds, 30 seconds, and 1 minute. The self-healing polymer has a thickness of 300 μm laminated on a 1.1 mm thick glass substrate. The self-healing polymer is formed by undergoing the freezing-thawing process of 3 cycles followed by the dehumidification process in the desiccator set to 22° C. and 17% RH for 72 hours. A scratch is induced by hand scribing using a razor blade through the 300 μm thick film. The damage began to be self-healed without any interventions or stimuli and the scratch nearly disappeared within 5 minutes at room temperature.

Figure 18:
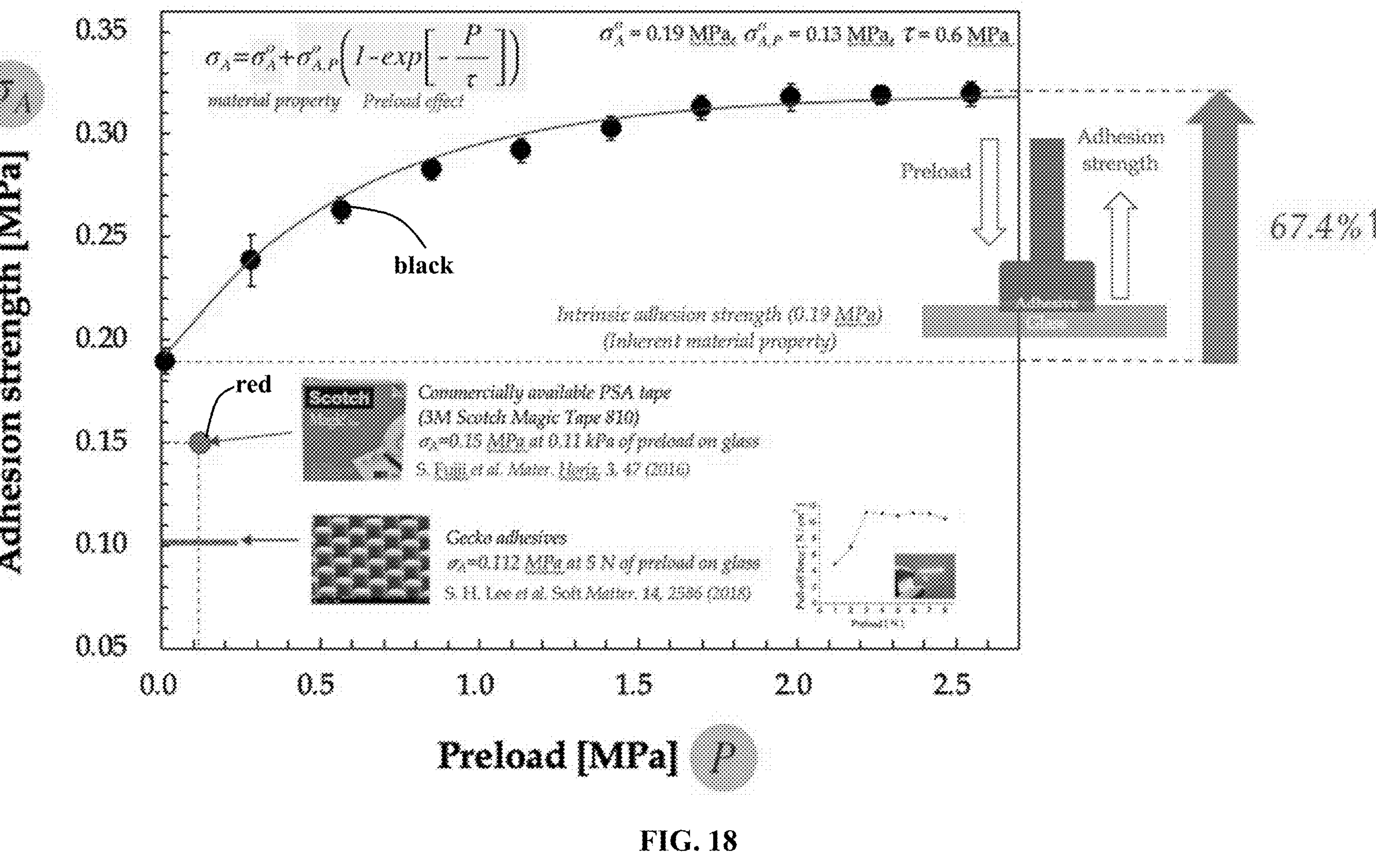

FIG. 18 measures a normal adhesive stress of a self-healing adhesive (SHA) prepared in accordance with certain aspects of the present disclosure laminated on a 1.1 mm thick glass substrate having a preload to estimate the property of pressure sensitive adhesive (PSA). All samples are fabricated by freezing-thawing process of 3 cycles followed by the dehumidification process in the desiccator set to 22° C. and 17% RH for 72 hours. A comparison is provided for results for a commercially available product (3M Scotch Magic® Tape 810) and bio-inspired Gecko-patterned physical adhesive.

Figure 19:
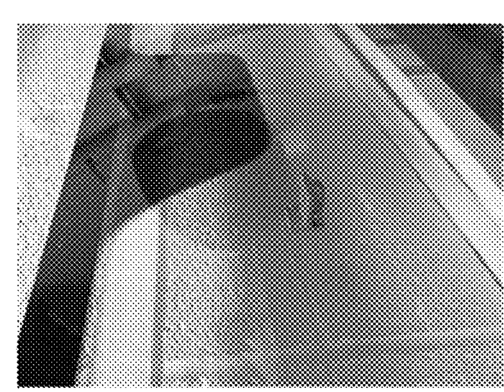
Figure 19:
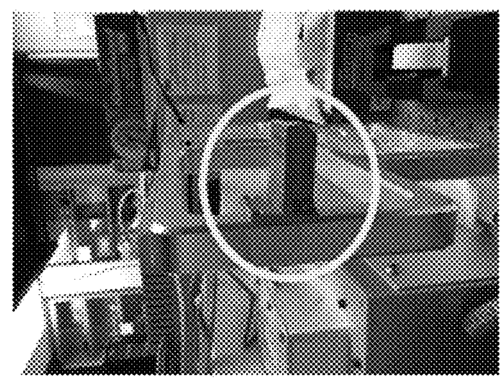
Figure 19:
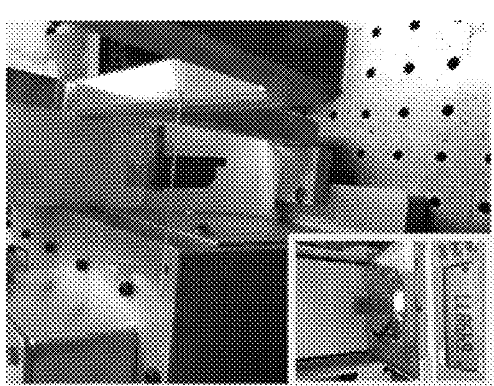
Figure 19:
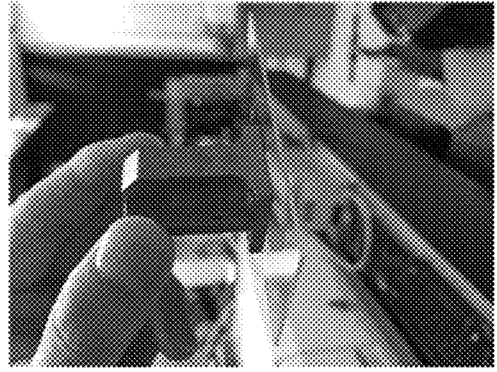

FIG. 19 shows photographs of observation of adhesive properties of a self-healing adhesive (SHA) prepared in accordance with certain aspects of the present disclosure based on Zn-PVA complexes via the freezing-thawing process of 3 cycles followed by the dehumidification process in the desiccator set to 22° C. and 17% RH for 72 hours. The adhesive characteristics of the SHA are evaluated for adhering various different substrates, including glass, metal, and plastic.

Figures 20A, 20B:
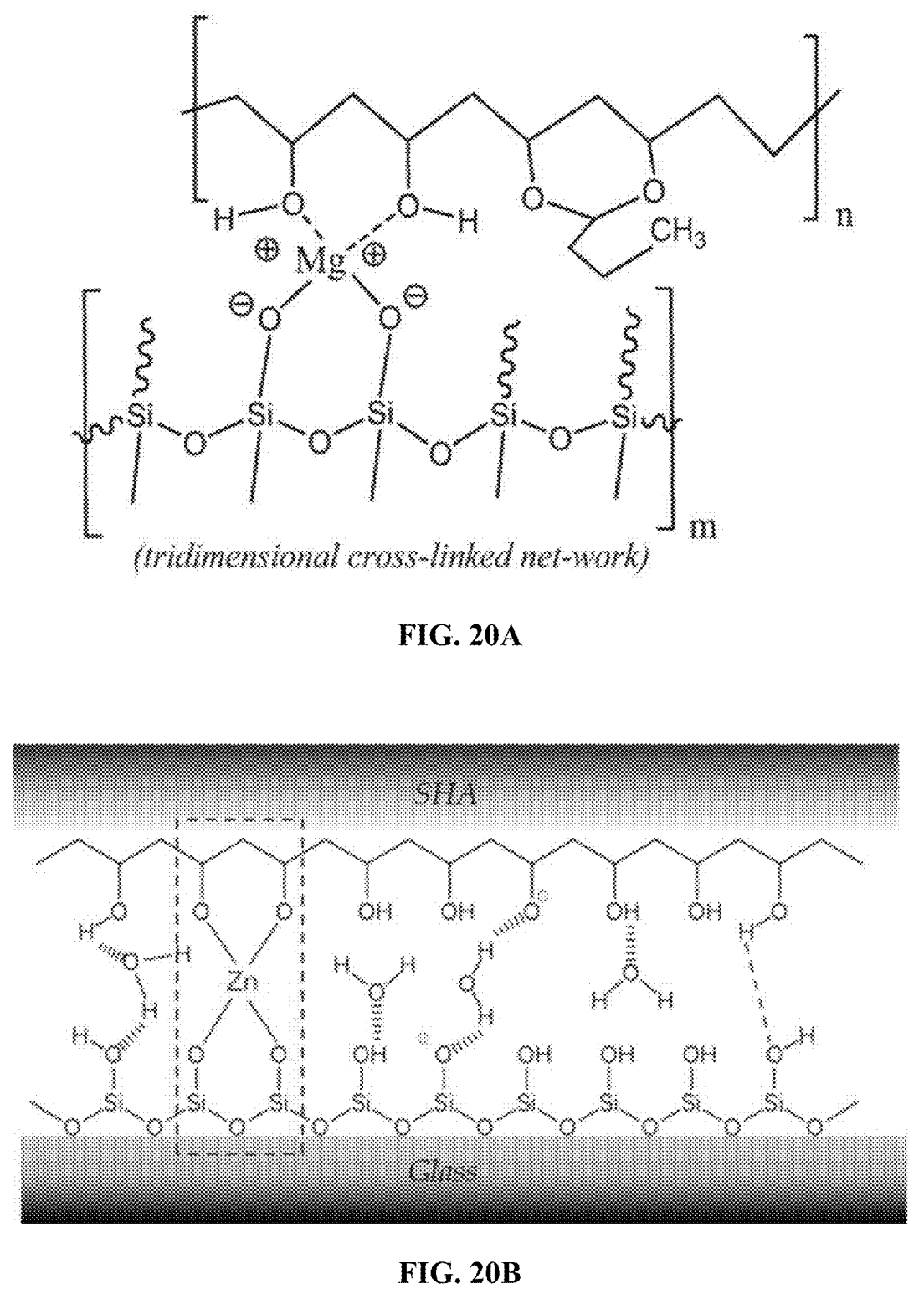

FIGS. 20A-20B show an influence of coordination bonding on adhesion between self-healing adhesive (SHA) prepared in accordance with certain aspects of the present disclosure and a glass substrate. Based on information from literature shown in FIG. 20A (from M. Tupy et al. Effect of water and acid-base reactants on adhesive properties of various plasticized poly(vinyl butyral) sheet, J. Appl. Polym. Sci. 127, 3474 (2013)), a hypothesized schematic structure of the SHAs prepared in accordance with the present disclosure is generated in FIG. 20B. The SHAs are believed to exhibit excellent adhesive strength on glass due to coordination bonds that form and plays a major role to enhance the adhesive property of the SHA.

Figure 21A:
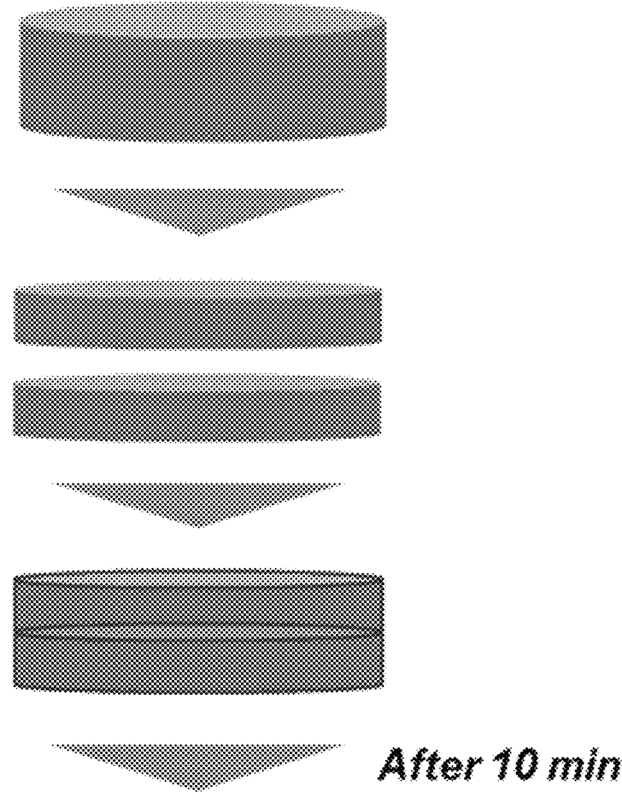
Figure 21A:
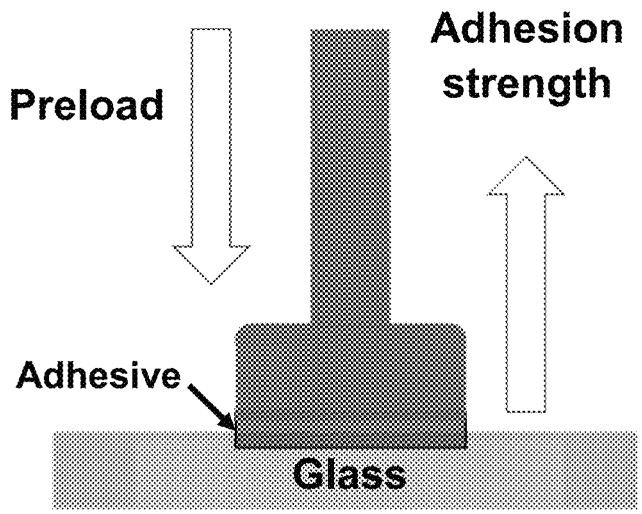
Figure 21B:
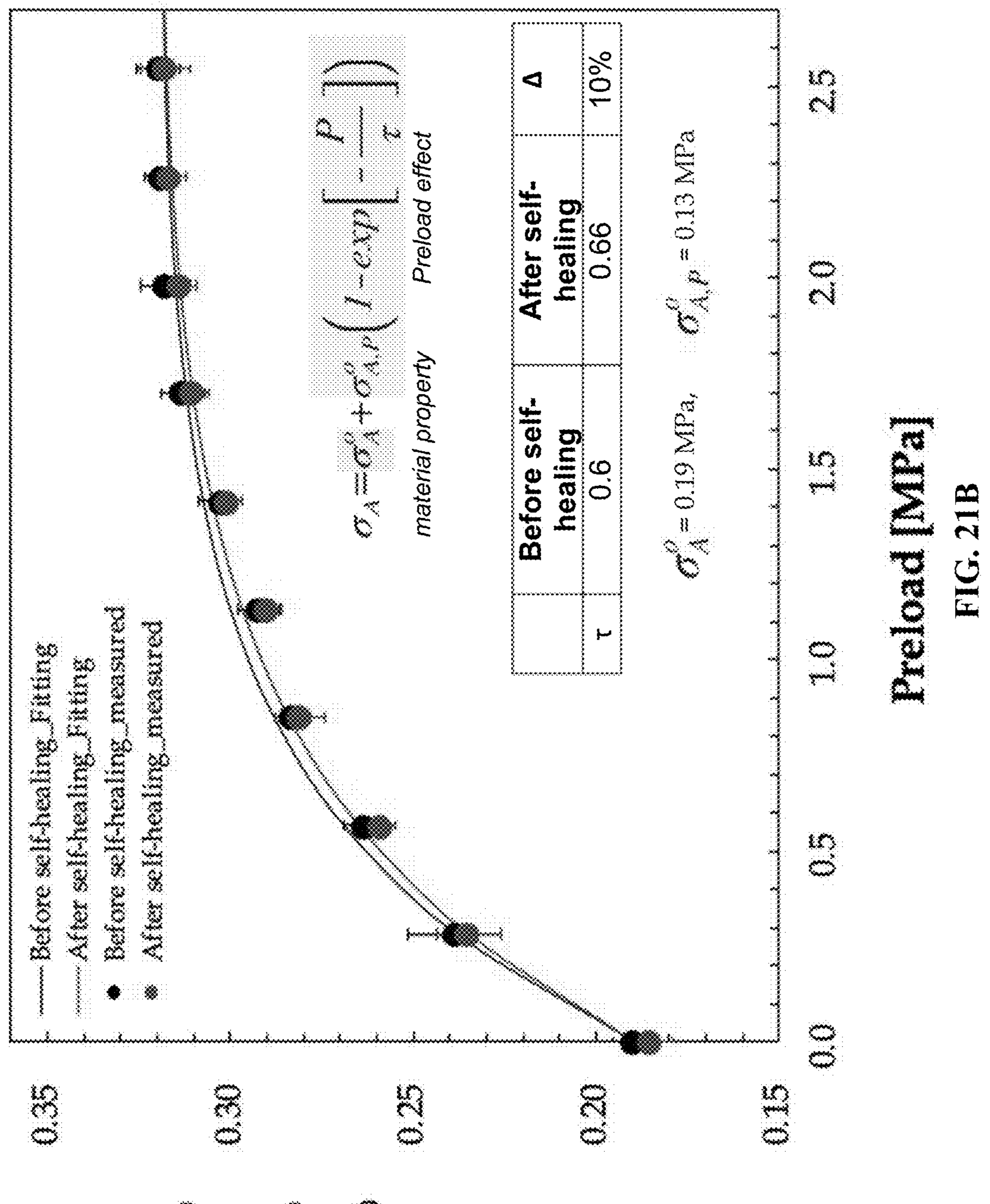

FIGS. 21A-21B show self-healing properties of the self-healing adhesives (SHAs) as a pressure sensitive adhesive (PSA) prepared in accordance with certain aspects of the present disclosure. FIG. 21A shows a schematic of a self-healing process for a PSA followed by adhesion to a glass substrate. FIG. 21B shows comparative adhesion strength versus preload for PSA samples before and after self-healing.

Figure 22:
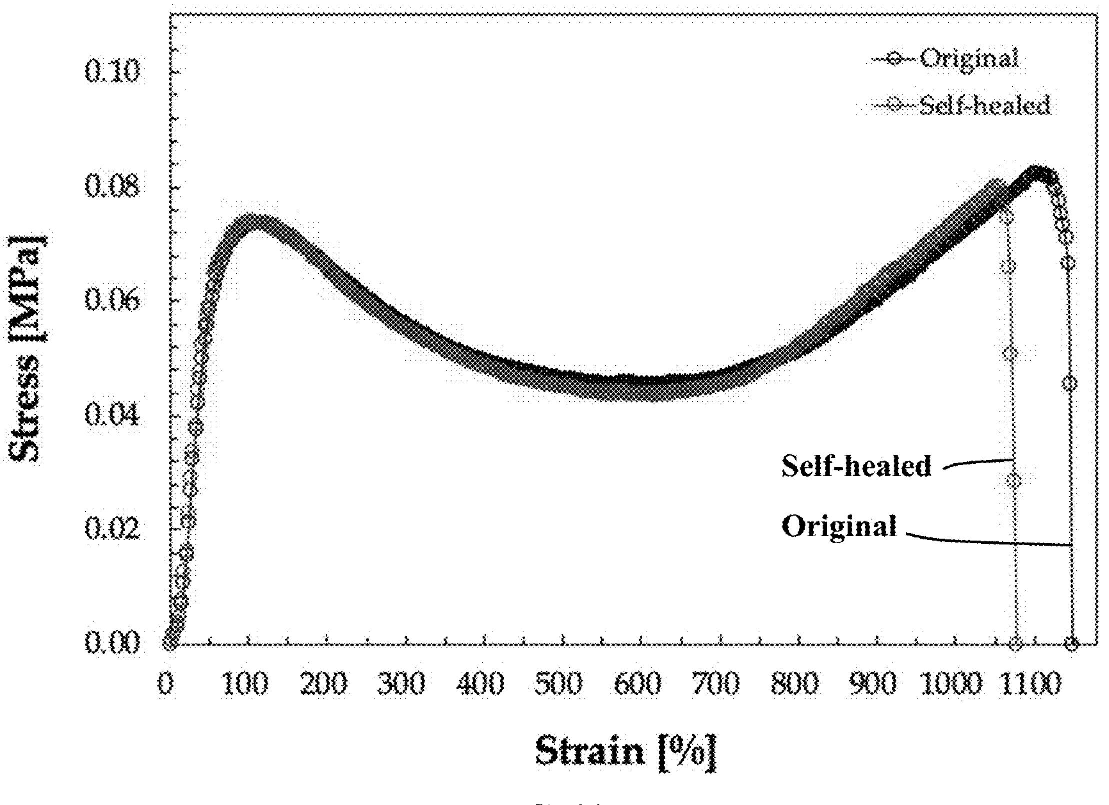

FIG. 22 shows a stress-strain curve demonstrating self-healing behavior of a self-healing adhesive (SHA) prepared in accordance with certain aspects of the present disclosure. The SHA has a PVA to $Zn^{2+}$ molar ratio of 10:3 and is fabricated by a freezing-thawing process of 3 cycles, followed by the dehumidification process in the desiccator set to 22° C. and 17% RH for 72 hours.

Figure 23A:
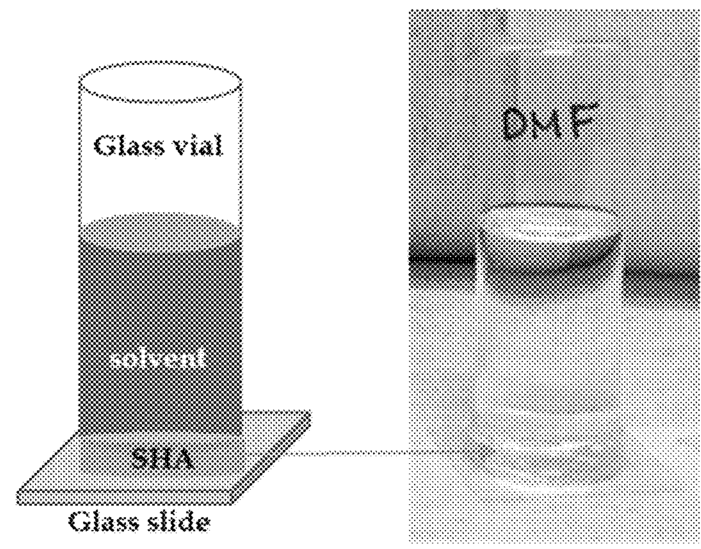
Figure 23B:
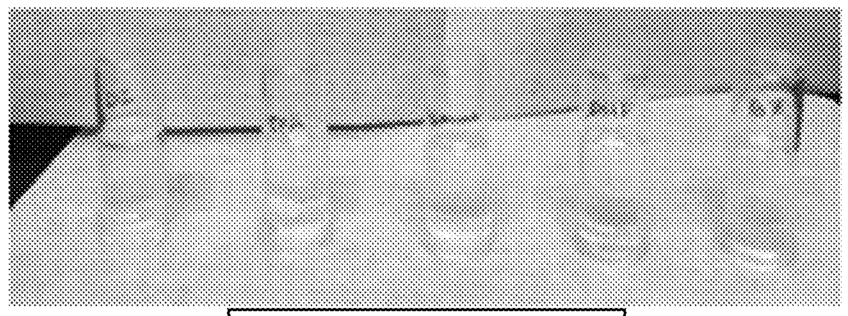
Figure 23C:
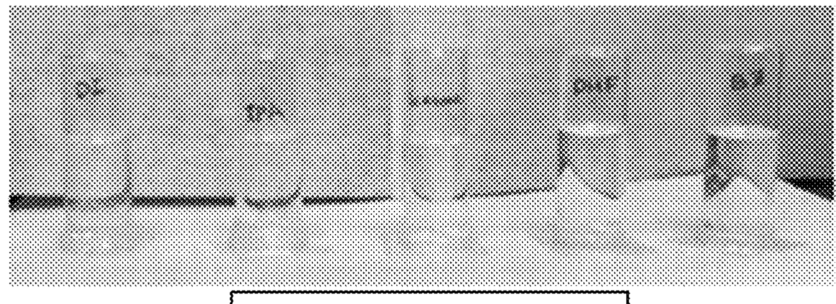

FIGS. 23A-23C show chemical stability of self-healing adhesive (SHA) prepared in accordance with certain aspects of the present disclosure in deionized water, isopropyl alcohol (IPA), acetone, dimethylformamide (DMF), and benzene when a glass vial and a glass slide are sealed with SHA for 15 days at ambient conditions. FIG. 23A shows adhesion in the presence of DMF, FIG. 23B is a photograph of samples filled with the various solvents listed above and FIG. 23C is a photograph of the same samples taken 15 days later.

Figure 24:
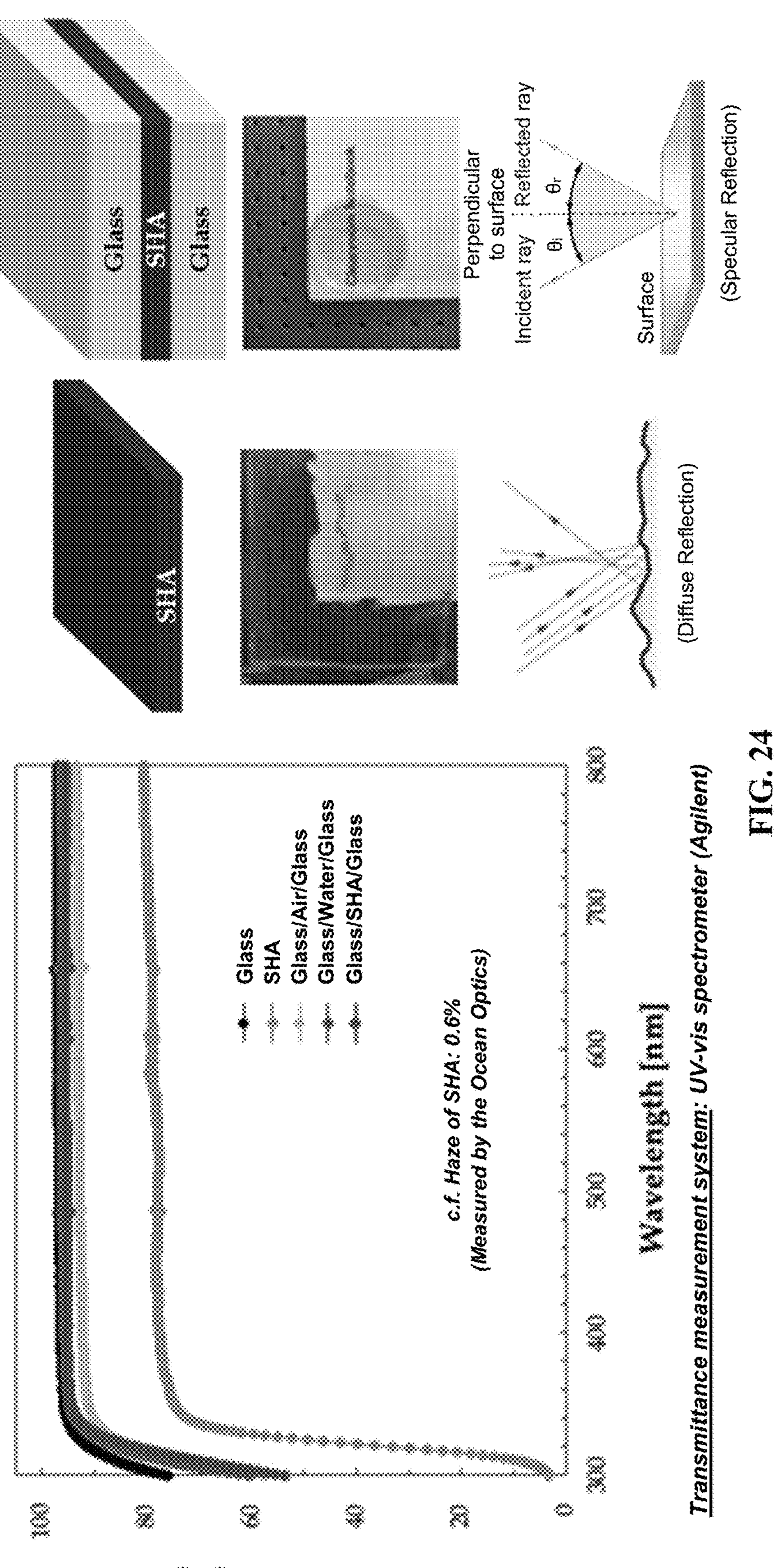

FIG. 24 shows optical transmittance and haze levels for self-healing adhesives (SHA) prepared in accordance with certain aspects of the present disclosure.

Figure 25:
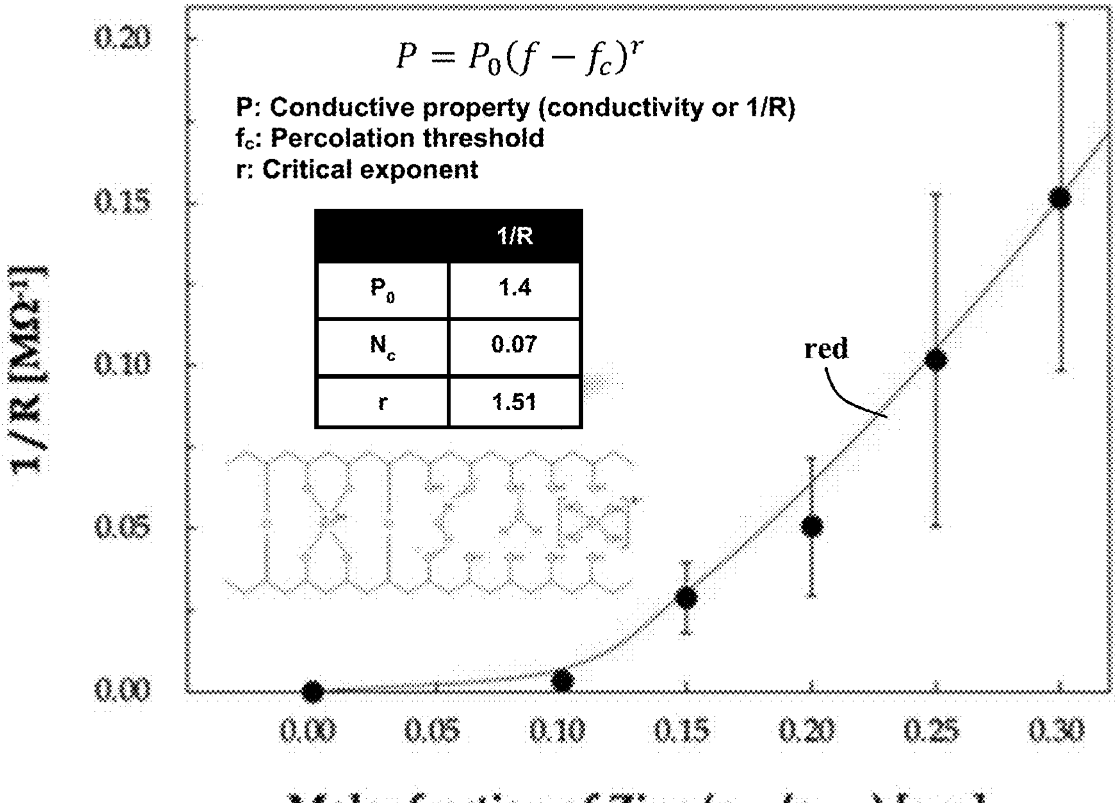

FIG. 25 shows electrical conductivity (resistivity) properties of the self-healing adhesive (SHA) as an ionomer based on the metal-ligand coordination bond and the percolation model shown inset. A red line is in good agreement with the measured data (black circles).

Figure 26:
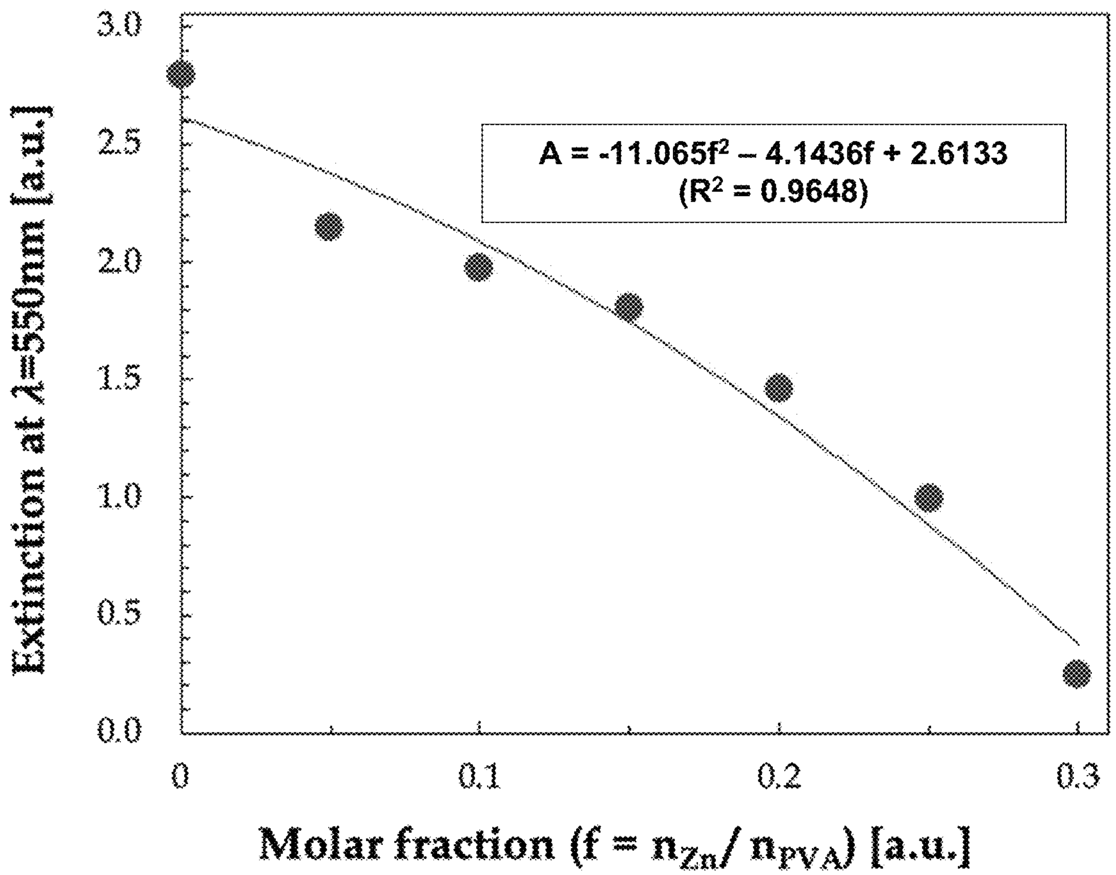

FIG. 26 shows optical extinctions at a wavelength of 550 nm for self-healing polymers prepared in accordance with certain aspects of the present disclosure in terms of a molar ratio of zinc ions to PVA ligand.

Figures 27A, 27B:
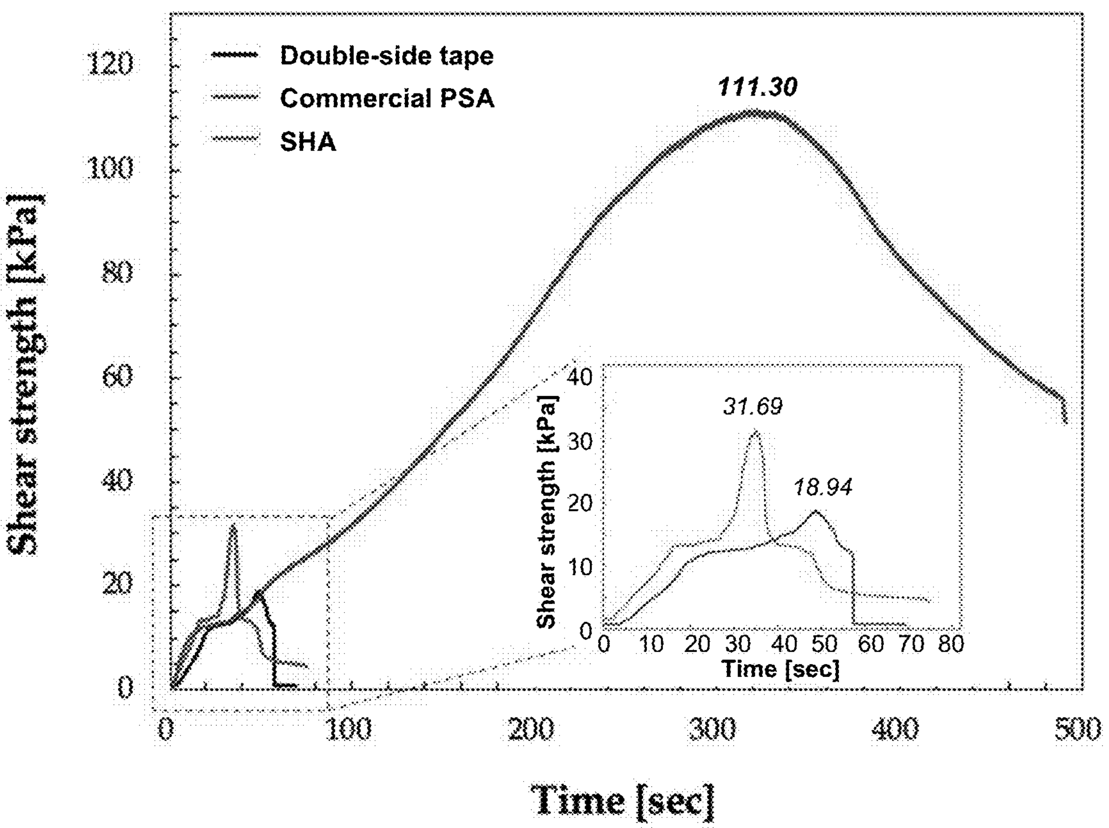
Figure 27C:
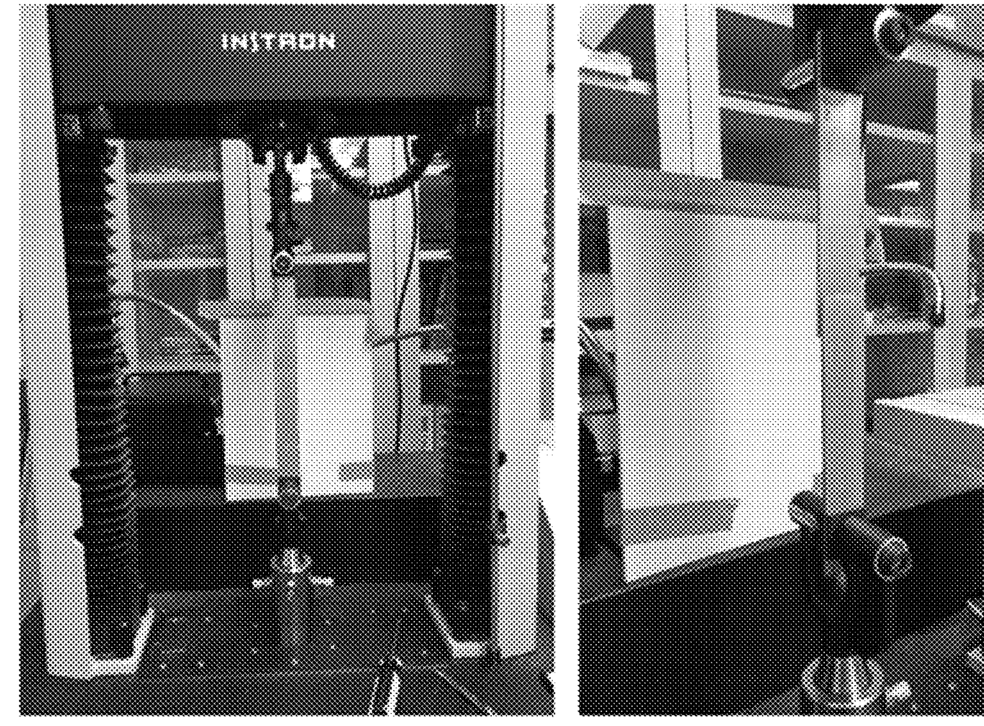

FIGS. 27A-27C show measurement of shear strength for self-healing polymers prepared in accordance with certain aspects of the present disclosure based on ASTM D1002.

FIG. 27A shows a comparison of shear strength versus time for double-sided tape, a commercial pressure sensitive adhesive, and a self-healing polymer prepared in accordance with certain aspects of the present disclosure. FIG. 27B shows a schematic of the setup for shear strength testing. FIG. 27C shows two photographs of the testing device for conducting the shear strength testing.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Self-healing materials are capable of repairing defects, such as mechanical defects, after being damaged. For example, a defect may be considered to be a microscale physical defect, for example, a cut or crack having a dimension of less than or equal to about 1,000 μm or a macroscale defect, for example, a cut or crack having a dimension greater than or equal to about 1,000 μm (1 mm).

One category of self-healing material incorporates metal-ligand complexes capable of effective self-healing, because a coordination bond between a metal and a ligand is reversible under ambient conditions. Metal-ligand interactions are reversible and repeatable. Further, the metal-ligand interactions tend to have much stronger bond strength to some substrates than that of hydrogen bonds, which can be advantageous for practical applications. Several self-healing polymers have been reported by using reversible metal-ligand interactions. However, some of these metal-ligand based self-healing materials cannot be self-healed at ambient conditions, but rather require external energy to be applied, such as light or heat to induce self-healing. Furthermore, some metal-ligand based self-healing materials require complex and complicated reactions to form the materials. For example, spontaneous self-healing materials based on the metal-ligand coordination bond in a pervasive network comprising of zinc-imidazole has been studied, as described in D. Mozhdehi et al., "Self-Healing multiphase polymers via dynamic metal-ligand Interactions," J. Am. Chem. Soc. 136, 16128, (2014). While the metal-ligand complexes could be formed in the soft matrix region having low glass transition temperature ($T_g$) within polymer to achieve the autonomous self-healing, to prepare structured polymers such as imidazole-containing brush polymers, complicated steps of polymerization were required.

Stretchable self-healing cross-linked polymers through the metal-ligand coordination bond has been also studied, as described in Y. Rao et al., "Stretchable self-healing polymeric dielectrics cross-linked through metal-ligand coordination, "J. Am. Chem. Soc. 138, 6020, (2016). Polydimethylsiloxane (PDMS) with bipyridine as ligands formed metal-ligand complexes via addition of metal salts such as $Fe^{2+}$ and $Zn^{2+}$, which can induce autonomous and stretchable self-healing materials. However, organic solvent involving toluene is required, which is often avoided for eco-friendly and biocompatible biomaterials (e.g., for electronics that contact skin).

Other self-healing metal-ligand polymer systems are described in U.S. Pub. No. 2017/0174842 to Wang et al. However, while these materials can undergo autonomous self-healing, they do so at a very slow pace. For example, self-healing is stated to occur only after about 2 days (48 hours) at ambient conditions.

In various aspects, a self-healing polymeric material is provided by the present disclosure that provides ultra-fast self-healing capabilities. For example, a self-healing polymeric material provided by certain aspects of the present disclosure is capable of self-healing a mechanical crack in less than or equal to about 30 minutes at ambient conditions when pressure is applied.

In certain variations that will be described further below, the polymer network comprises poly(vinyl alcohol) (PVA). The PVA polymer may be cross-linked or a hydrogel. The PVA comprises one or more ligands having a transition metal ion coordination site that is capable of forming a coordination bond with a transition metal ion. The coordination bond formed between the ligand and metal ion may be reversible. In certain aspects, multiple ligands of the PVA polymer may have metal ion coordination sites capable of forming a coordination bond with a transition metal ion. The polymer network may further include an additive known to those of skill in the art. By way of non-limiting example, such an additive may be selected from the group consisting of: a plasticizer, a crosslinker, nanoparticle inclusions, and combinations thereof.

The transition metal ion may be a metal selected from Groups 4-12 of the IUPAC Periodic Table, optionally a transition metal of Row 4 of IUPAC Periodic Table, for example, selected from zinc (Zn), iron (Fe), and/or copper (Cu), and the like. In certain other aspects, the metal may be gold (Au). In certain variations, the transition metal is zinc (Zn) and the transition metal ion is a zinc ion (e.g., $Zn^{2+}$). Zinc has a fast ligand exchange rate and participates in a reversible metal-ligand interaction, making it particularly suitable for use as a transition metal ion in the self-healing materials provided herein.

In certain aspects, the self-healing polymeric material comprises a polymer network having a transition metal ion distributed therein. The polymer network may define one or more ligands that have a transition metal ion coordination site. Thus, the transition metal ion distributed in the polymer network and capable of interacting with the at least one transition metal ion coordination site via a reversible coordination bond. It should be noted that one transition metal ion may interact with multiple distinct transition metal ion coordination sites in multiple ligands of the polymer network. The metal-ligand interactions can be rapidly repeated. For example, activation and deactivation of metal-ligand bonding can be adjusted by the kinetic parameters of metal-ligand complexes. This approach based on the kinetics of the metal-ligand complexes enables formation of ultra-fast self-healing materials with highly tunable mechanical properties, as will be discussed further herein.

In various aspects, self-healing polymeric materials are provided. In certain variations, a self-healing polymeric material comprises a polymer network that may be cross-linked and capable of a strong reversible coordination bond with a metal ion. The polymer network may comprise poly(vinyl alcohol) (PVA). PVA is a water-soluble polymer that has many excellent characteristics such as film forming property and high bonding strength as well as anti-static and biocompatible, biodegradable properties. PVA can be used as a raw material for various applications, including as a coating, adhesive agent, surfactant, emulsifier, dispersant, and film. The polymer network may be further cross-linked by exposure to actinic radiation (e.g., UV radiation), e-beam, or thermal crosslinking to improve mechanical properties of the materials formed, such as enhancing a Young's modulus for self-healing polymers.

In one variation, a polymer network comprising poly (vinyl alcohol) (PVA) defines one or more ligands having a transition metal ion coordination site. Further, a transition metal ion, such as a zinc (Zn) ion, is distributed in the polymer network and capable of interacting with the at least one transition metal ion coordination site via a coordination bond. The coordination bond may be reversible. Zinc-poly (vinyl alcohol) (Zn-PVA) has a highly dynamic metal-ligand interaction that provides a strong spontaneous self-healing mechanism. Zinc ions can readily transfer between ligands within the PVA polymer in an association and dissociation mechanism. This active transfer ability of zinc ions is capable of forming a dynamic coordination bond under optimized conditions. In addition, zinc ions can facilitate forming the polymer network that includes polymer chains cross-linked through coordination bonds with the hydroxyl groups of PVA. This polymer network, based on metal-polymer ligand interactions significantly improves the elongational properties of self-healing materials.

If the self-healing material suffers from damage in the form of a mechanical defect, like a crack or cut, the self-healing polymeric material can heal at ambient temperature and pressure conditions upon the application of low levels of pressure without the need to apply any external energy, stimuli, or use of chemical agents to promote self-healing and damage repair. The polymer network is capable of self-healing mechanical damage, such as a crack or cut, in less than or equal to about 30 minutes via transition metal-ligand interaction upon application of pressure at ambient conditions.

In various aspects, the present disclosure provides self-healing polymeric materials, which may comprise Zn-PVA complexes to overcome a low self-healing efficiency of conventional hydrogen-bonding based PVA hydrogels. Self-healing PVA hydrogels (containing only PVA) are described in H. Zhang et al., "Poly(vinyl alcohol) hydrogel can autonomously self-heal," ACS Macro Lett. 1, 1233 (2012) a having self-healing properties based on PVA's hydrogen bonds. However, self-healing in these PVA hydrogels depends on hydrogen bonding alone, thus requiring a high concentration of raw material (over 35 wt. % of PVA) to induce self-healing, as well as having a long self-healing time of at least a few hours up to several days. In contrast, as noted above, the self-healing polymeric materials provided by the present disclosure are capable of self-healing a crack or cut in less than or equal to about 30 minutes upon application of pressure at ambient conditions by virtue of the via transition metal-ligand interaction. In certain aspects, the self-healing mechanism provided by the inventive materials is ultra-fast self-healing via metal-ligand interactions accompanied by activation energy control. In various aspects, a self-healing time may be characterized as the time for material having mechanical damage, such as a crack, fissure, or cut, that is reattached and binds together, so that it reaches a point where that material is considered to be self-healed.

For example, a self-healed material may be stretched to an elongation under strain of at least about 100% without any fractures in healed region (e.g., after adhering two separated parts together), which is measured by $$\frac{L_F - L_O}{L_O} \times 100 = \%\ \text{elongation},$$

where $L_F$ is the final length and $L_O$ is the original length. Thus, if an initial length $L_O$ is 1 mm and the final length $L_F$ is 2, then $$\frac{2-1}{1} \times 100 = 100\%,$$

such that the length has been doubled without fracture or damage. In certain variations, a self-healed material may be stretched to an elongation under strain of at least about 200%, optionally greater than or equal to 500%, and in certain variations, optionally greater than or equal to about 1,000% after self-healing of the mechanical crack or cut.

In certain aspects, a self-healing time may be less than or equal to about 10 minutes, optionally less than or equal to about 5 minutes, optionally less than or equal to about 1 minute, optionally less than or equal to about 30 seconds, optionally less than or equal to about 15 seconds, and in certain variations, optionally less than or equal to about 10 seconds.

Embodiments of this disclosure demonstrate ultra-fast and autonomous self-healing polymers based on the coordination bonds associated with Zn-PVA complexes. A self-healing polymeric material may include a cross-linked polymer network comprising Zn-PVA complexes, where the ligands in the PVA network have transition metal coordination sites providing the ability to interact with the at least one transition metal ion coordination site via a reversible coordination bond. These ligand-transition metal (Zn) complexes predominant, as where transition metal water complexes are less prevalent. As discussed further below, the presence of significant amounts of Zn—$H_2O$ complexes may slow self-healing and thus, activation energy levels and self-healing rates can be controlled, for example, through a dehumidification process. While a significant advantage of a coordination bond is that it is less sensitive to moisture than hydrogen bonds, which lack of stability against moisture, coordination bonds are still affected by moisture. The presence of water can result in the reduction of self-healing efficiency. In certain aspects, the self-healing polymer comprises water, a first complex is formed by the transition metal ion and the at least one transition metal ion coordination site on the ligand (e.g., Zn-PVA), and a second complex is formed by the transition metal ion and water (e.g., Zn—$H_2O$), wherein a ratio of the first complex to the second complex is greater than or equal to about 1:1 and less than or equal to about 5:1. This is based on an assumption that Zn ion has a coordination number of 4, Zn-PVA complex, that is, $[Zn^{2+}(CH_2CHO^-)_4]^{2-}$ has a molar ratio of 10:2.5. In other words, one mole of zinc ion could form a complex with 4 moles of hydroxyl group in PVA. Because the self-healing polymers may have a 10:3 molar ratio in certain variations, the ratio between Zn-PVA and Zn—$H_2O$ could thus 5:1. This surmises that zinc ions participate in the formation of Zn-PVA complexes first, and then the residual zinc ions form Zn—$H_2O$ complexes. However, in the case that zinc ions form two types of complexes simultaneously, the ratio between two complexes might decrease to about 1:1 through about 4:1.

Therefore, certain embodiments described herein provide a new approach to realizing ultra-fast and spontaneous self-healing polymers induced by the metal-ligand interactions, which further provides activation energy control.

Figures 1, 2A, 2B:
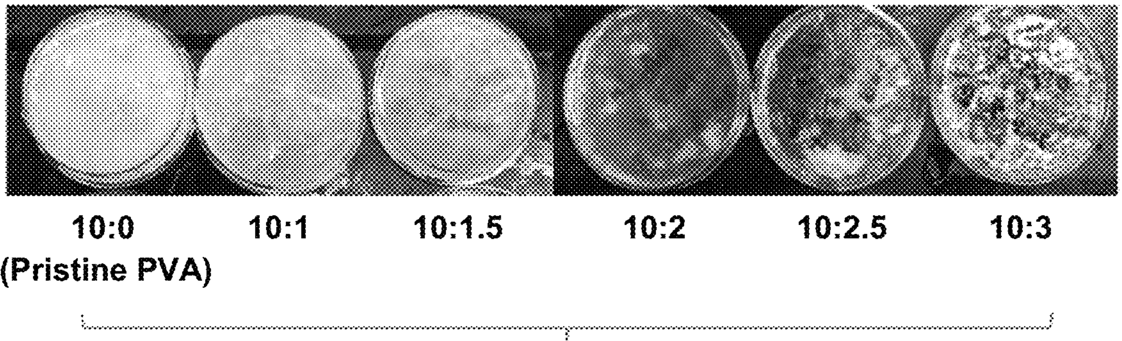

FIG. 1 shows visual observations of features for self-healing polymers in comparing relative amounts of a transition metal ion, here zinc, and a ligand of poly(vinyl alcohol) (PVA) after three cycles of freezing-thawing. The ratios range from a ratio of moles of PVA ($N_{PVA}$) to moles of zinc ions ($Zn^{2+}$) ($N_{zn}$) of 10:0 up to 10:3. Whereas the pristine PVA hydrogel having no zinc ions (ratio of $N_{PVA}$:$N_{zn}$ of 10:0) is optically opaque. The Zn-PVA complexed hydrogels (ratios of $N_{PVA}$:$N_{zn}$ of 10:1 to 10:3) gradually becomes transparent as the molar ratio of zinc to PVA increases, as shown in FIG. 1. For example, a ratio of $N_{PVA}$:$N_{zn}$ of 10:2 or greater appears to start having transparency. This can be attributed to the steric hindrance of zinc ions, which prevent PVA from being cross-linked via physical crosslinking during freezing-thawing cycles. Visual observation of optical transparency is taken into account to estimate a change of crosslinking density during the formation process. For example, optical extinction at the wavelength of 550 nm has been measured as reflected in FIG. 26 for self-healing polymers prepared in accordance with certain aspects of the present disclosure having different molar ratios of metal-ligand using an Agilent Cary 6000 UV-Vis spectrophotometer. The higher extinction indicates the material is less transparent. Optical extinction of pristine PVA hydrogel physically crosslinked without any metal ions and self-healing polymer with a molar ratio of zinc ion and PVA ligand of 10:3 is 2.79 and 0.25, respectively. The extinction of a self-healing polymer decreases about 91% compared with that of pristine PVA hydrogel. Therefore, it is indirectly estimated that zinc ions affect the decrease in the density of physical crosslinking in the polymer. The optical extinction represents a quadratic decrease with respect to a molar ratio of zinc ions and PVA ligands as shown in FIG. 26.

FIGS. 2A-2B illustrate two types of complexes existing within the self-healing polymeric material. FIG. 2A shows a Zn-PVA ligand complex that facilitates self-healing bonds in the polymeric material FIG. 2B on the other hand is a Zn—$H_2O$ complex that appears to inhibit formation of a dynamic bond that promotes self-healing. The Zn-PVA complexes in FIG. 2A are believed to play a significant role in inducing ultra-fast and autonomous self-healing characteristics of the self-healing material, as where the Zn—$H_2O$ appears to be an inhibitive complex that interferes with the formation of desired metal-polymer networks. As discussed above, while not necessarily limiting, a ratio between Zn-PVA complexes and Zn—$H_2O$ complexes can be at least 1:1 to 5:1, under an assumption that zinc ions participate in the formation of Zn-PVA complexes first, and then the residual zinc ions form Zn—$H_2O$ complexes. In other words, 83% of zinc ions bond with PVA ligand, and the rest of zinc ions (17%) subsequently form Zn—$H_2O$ complexes. However, in the case that zinc ions form two type of complexes simultaneously, the amount of zinc ions participating in the coordination with water molecules may increase.

Thus, in certain aspects, controlling the activation energy of the self-healing material can be achieved by controlling an amount of water in the self-healing material prepared in accordance with certain aspects of the present disclosure. In certain embodiments prepared according to the present disclosure, the activation energy can be controlled through a dehumidification process, so that a self-healing polymer includes a cross-linked polymer network linked via the preferable Zn-PVA complexes, rather than Zn—$H_2O$ complexes. By reducing water content in the self-healing materials, especially PVA-Zn self-healing materials, ultra-fast self-healing can occur, for example, as noted above in certain embodiments with a self-healing time less than about 10 minutes, or about 5 minutes, or about 1 minute, or about 10 seconds, by way of example.

Figure 3:
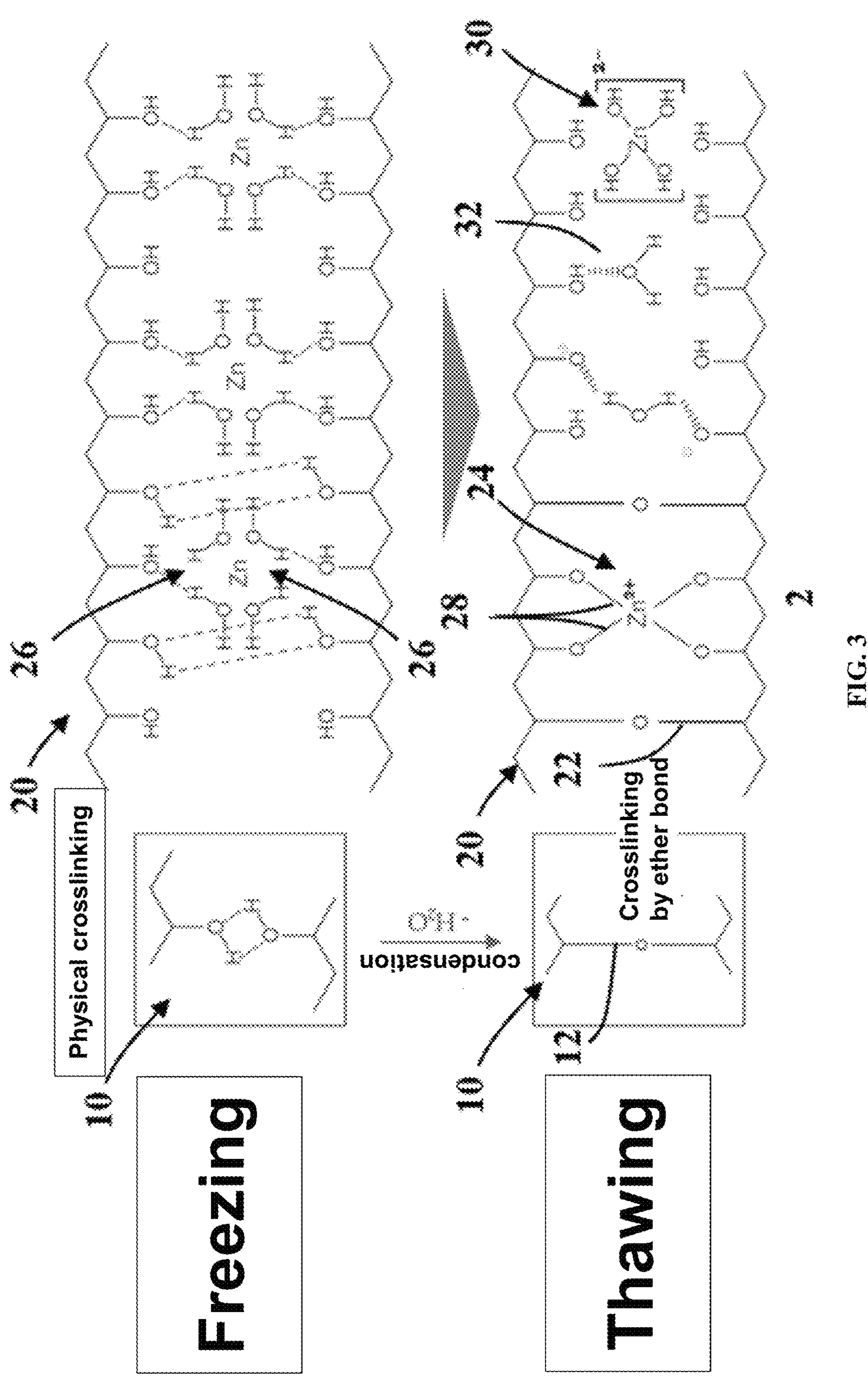
FIG. 3 shows a mechanism for forming Zn-PVA complexes in a self-healing material prepared in accordance with certain aspects of the present disclosure via a freezing-thawing process.

While not limiting the present teachings to any particular theory, FIG. 3 illustrates bond structures in a self-healing material 20 prepared in accordance with certain aspects of the present disclosure that are believed to occur during a freezing-thawing process. Employing a freezing-thawing process to form a self-healing polymeric system in accordance with certain aspects of the present disclosure can make a film that is more capable of handling, for example, to form a standing film that is mechanically robust. Further, using the freezing-thawing process helps to induce formation of a covalently crosslinked network, thus yielding a high chemical stability as shown in FIGS. 23A-23C. Notably, in accordance with certain aspects of the present disclosure, methods of making a self-healing polymer system may include combining a precursor of a polymer network, such as poly(vinyl alcohol) (PVA), and a precursor of a transition metal, such as a zinc salt, such as zinc nitrate hexahydrate, which may be mixed together to distribute the zinc ions throughout the polymer network. In certain variations, a ratio of moles of PVA ($N_{PVA}$) to moles of zinc ions ($N_{zn}$) may be greater than or equal to about 20:1 to less than or equal to about 10:5 and in certain variations, greater than or equal to about 10:1 to less than or equal to about 10:3. In certain aspects, additional reactions, such as crosslinking and bonding, may occur. In one variation, a process involving freeze-thaw cycling is used for facilitating desired reactions, including condensation, as well as crosslinking and coordination bond formation, which generates a hydrogel when PVA is used. Thus, the mixture of polymer and transition metal may be frozen, for example, in an environment having a temperature of −15° C. for 24 hours. The fully frozen samples are then thawed out at ambient conditions (e.g., room temperature at approximately 23° C.), for example, for 3 hours. This freezing-thawing process is repeated multiple times, for example, three times in three cycles, resulting in the formation of Zn-PVA complexed hydrogels. Further, the self-healing polymer system may be further heated, for example, at temperature of ranging from greater than or equal to about 30° C. to less than or equal to about 60° C. Additionally, the self-healing polymer system may be dried or dehumidified to remove water from the sample. By way of example, such a water removal process may involve a dehumidification process in a desiccator, which may have a temperature of about 22° C. and 17% relative humidity. Depending on the amount of water removal desired, the process may be conducted for different times, for example, greater than or equal to about 24 hours, optionally greater than or equal to about 48 hours, and optionally greater than or equal to about 72 hours.

With renewed reference to FIG. 3, as shown on the left in boxes, a pristine PVA hydrogel 10 free of any zinc ions is mainly linked in the network via ether bonds 12 via a freezing-thawing process. However, as can be seen in the structures on the right, when zinc ions are introduced and distributed within the PVA polymer matrix 20, the number of ether bonds 22 decreases with an increase in Zn-PVA complexes 24. The PVA has ligands that define a transition metal ion coordination site 26 corresponding to hydroxyl groups capable of coordination bonding with a transition metal, like Zn. Thus, the majority of hydroxyl groups of PVA participate in coordination bonds 28 with metal ions, rather than the hydrogen bonding with water molecules. As shown in FIG. 3, some water molecules form Zn—$H_2O$ complexes 30, which are referred to as an inhibitive complex, because they can participate in hydrogen bonding 32 with the PVA. Thus, the intrinsic characteristics of pristine PVA hydrogel (free of zinc) diminish in the presence of metal-ligand interactions when zinc is introduced into the polymeric matrix.

Figure 4:
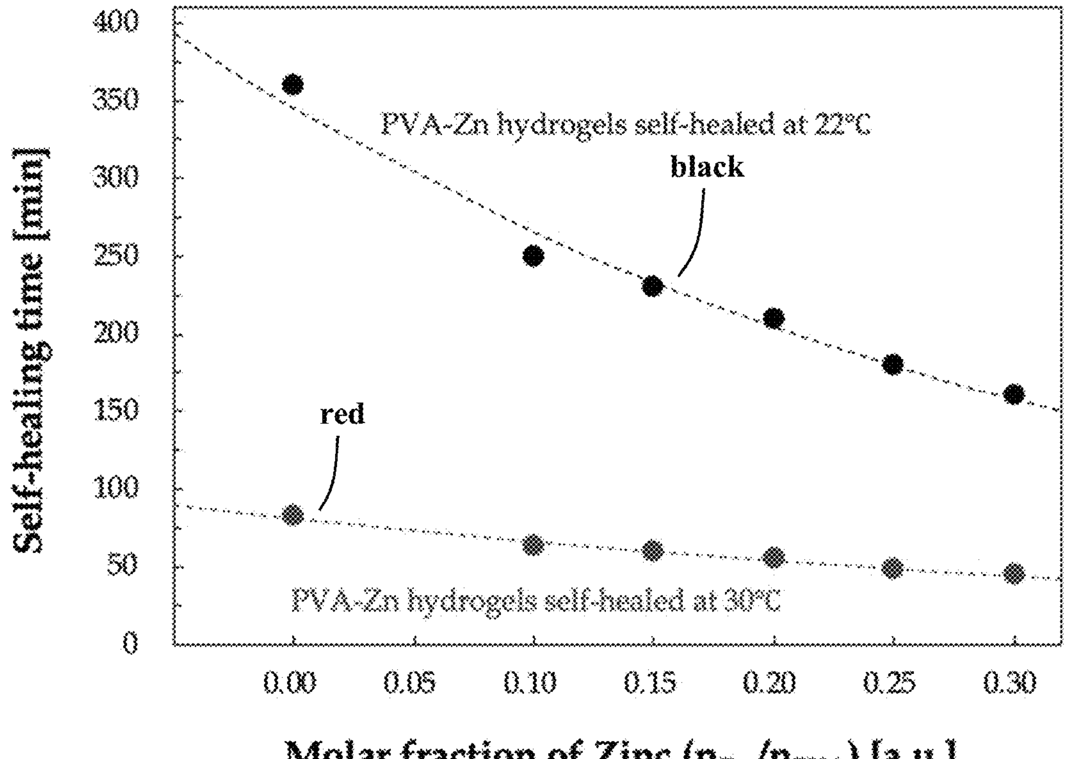
FIG. 4 shows an evaluation of self-healing time for certain PVA-Zn hydrogel self-healing polymers prepared in accordance with certain aspects of the present disclosure fabricated via a freezing-thawing process and for one example self-healed at 22° C. (designated by black circles) and for the other example having additional heating at 30° C. (designated by red circles).

FIG. 4 shows a self-healing time for self-healing polymeric materials prepared in accordance with the certain aspects of the present disclosure having different molar ratios of zinc to PVA. First, a sample is cut into two pieces to replicate potential mechanical damage that may occur. Then, the two pieces are contacted with one another, which may also be conducted with optional applied pressure, for example less than or equal to about 0.5 MPa or optionally less than or equal to about 0.1 MPa. The contact and optional applied pressure thus adheres and rebinds the parts and promote metal-ligand interaction. The self-healing time is defined as a time available to stretch a sample to an elongation of at least 200% without any fractures in healed region. After recovery for the prescribed self-healing time, two pieces of specimen cut can self-heal autonomously at 22° C. (black circles) and elevated temperatures at 30° C. (red circles). Hydrogels fabricated via freezing-thawing method of 3 cycles requires a long self-healing time of about 3 hours through 6 hours to recover to their original state from breaking at room temperature, as represented by black circles and line in FIG. 4. However, the self-healing time dramatically deceases when Zn-PVA based hydrogels are stored at elevated temperatures 30° C. for 10 minutes, as can be seen as red circles as shown in FIG. 4.

Figure 5:
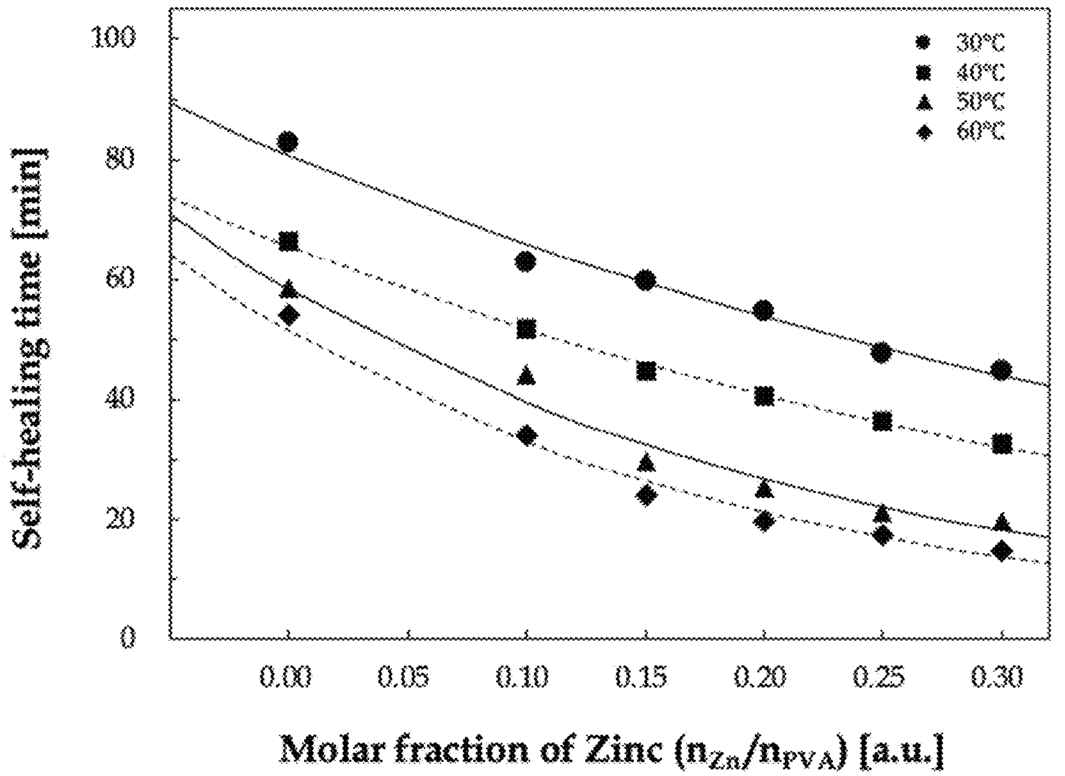
FIG. 5 shows an effect of temperature on a self-healing time for self-healing polymers prepared in accordance with certain aspects of the present disclosure based on the coordination bonds formed via the freezing-thawing process followed by additional heating at 30° C., 40° C., 50° C., or 60° C.

For further understanding of heating effect on the self-healing efficiency, self-healing tests are conducted at various temperatures (30° C., 40° C., 50° C., and 60° C.). FIG. 5 represents the effect of heating temperature on the self-healing time for the self-healing hydrogels prepared in accordance with certain aspects of the present disclosure. The self-healing time evidently declines when Zn-PVA complexed hydrogels are thermally treated at elevated temperatures (30° C., 40° C., 50° C., and 60° C.) for 10 minutes, as can be seen in FIG. 5. This effect is believed to result from an increase in the rate of reaction to form the coordination bonds between zinc ions and ligands in the PVA. According to the Arrhenius equation set forth below, the kinetic constant increases with temperature, thereby activating the reaction to form Zn-PVA complexes:

$$k = A \cdot \exp\left(-\frac{E_a}{k_B T}\right),$$

where k is the kinetic constant related to a self-healing rate, $E_a$ is the activation energy, $k_B$ is the Boltzmann constant, and T is the absolute temperature. According to the Arrhenius equation, a rate of self-healing is dominated by temperature and activation energy. In general, higher temperatures can induce an increase in the reaction constant from the standpoint of kinetics. Another effective way to increase the kinetic constant is to reduce the activation energy. As a result, the activation energy of certain self-healing polymers prepared in accordance with the present disclosure could be lowered via a dehumidification or water removal process. This result can be attributed to the decrease in the number of Zn—$H_2O$ complexes that inhibit the self-healing efficiency. It is believed that after removing of water molecules, most of the zinc ions can then participate in the formation of coordination bonds with PVA ligands, thus enhancing a reversible ability of breaking and reforming.

FIG. 6 demonstrates the effect of dehumidification on the self-healing efficiency of self-healing polymers prepared in accordance with certain variations of the present disclosure. In FIG. 6, self-healing polymer samples of PVA and Zn hydrogels are formed. Those that undergo the freezing-thawing process for 3 cycles (black circles) are shown in as black circles. Self-healing polymer samples formed by the same freeze-thaw processes with a subsequent heating at 60° C. are shown as red circles. Finally, self-healing polymer samples formed by the same freeze-thaw processes, followed by the dehumidification process in the desiccator set to 22° C. and 17% RH for 72 hours are shown as blue circles.

The ability for the self-healing polymer to undergo ultra-fast self-healing is based on the control of activation energy by removing water from the polymer, e.g., via the dehumidification. In one aspect, dehumidifying can be conducted by storing self-healing polymer samples in a desiccator set to 17% relative humidity at 22° C. for 72 hours. Interestingly, the self-healing time is dramatically reduced to about 5 to 10 seconds when a molar ratio of zinc ($N_{zn}$) to PVA ($N_{PVA}$) is 0.3, after dehumidification, as shown in the data (blue circles) of FIG. 6.

FIG. 7 summarizes the self-healing time corresponding to data of the dehumidified self-healing PVA and Zn polymers (blue circles shown in FIG. 6). This ultra-fast self-healing ability can be attributed to an increase in Zn-PVA complexes, rather than Zn—$H_2O$ complexes as water molecules within hydrogels are removed via the dehumidification process. Water can act as a barrier inhibiting the reaction of zinc ions with hydroxyl groups of PVA to form the coordination bonds. Therefore, the activation energy ($E_a$) term from the Arrhenius equation increases when the self-healing polymer possesses high amounts of water within material. From the viewpoint of kinetics, the kinetic constant for the formation of Zn-PVA complexes would increase as a water barrier is removed.

FIGS. 8 and 9 are data experimentally supporting the above hypothesis on the change of activation energy via the dehumidification. FIGS. 8 and 9 represent a relationship of kinetic constant (k) and absolute temperature (T) based on the Arrhenius equation for the self-healing polymers prepared in accordance with certain aspects of the present disclosure before and after dehumidifying, respectively. FIG. 8 shows that the logarithmic self-healing rate constant (ln(k)) is inversely proportional to the inverse of absolute temperature (1/T) for the self-healing polymers fabricated by the freezing-thawing process of 3 cycles without the dehumidification process. The correlation between the rate constant and the inverse of temperature based on experimental data is in good agreement with the Arrhenius equation, where the activation energy ($E_a$) corresponds to the slope of linear fitting. FIG. 9 shows the self-healing rate constant which is inversely proportional to the absolute temperature for the self-healing polymers fabricated by the freezing-thawing process of 3 cycles followed by the dehumidification process in the desiccator set to 22° C. and 17% RH for 72 hours. The activation energy corresponding to the slope in the linear fitting shows a different tendency in terms of the molar ratio of zinc ions and polymer ligand. The slope decreases gradually with an increase in the molar ratio of metal-ligand after dehumidification seen in FIG. 9 versus in FIG. 8.

FIG. 10 illustrates the activation energies obtained from FIGS. 8 and 9 with respect to the molar ratio of metal-ligand. Most of zinc ions are estimated to participate in forming Zn-PVA complexes contributing to enhancing the self-healing efficiency of the self-healing polymer system by lowering the probability of the formation of Zn—$H_2O$ complexes inhibiting the metal-polymer interactions. Thus, in certain variations, the activation energy of self-healing system is controlled via the dehydration process. Consequently, certain embodiments provided by the present disclosure could be realized by reducing activation energy by enhancing the interactions between metal ions and polymer ligands. The correlation between the activation energy and the molar ratio of metal-ligand satisfies the $E_a=a\cdot f+b$ following equation, where $$f = \frac{n_{Zn}}{n_{PVA}}$$

where $E_a$ is an activation energy, f is a molar ratio between number of moles of metal ions and number of moles of ligand (polymer), a is a slope of the linear fitting on a plot of activation energy versus the molar ratio of metal to ligand, b is a y-intersection in the same plot, that is, the activation energy of self-healing polymers without any metal ions.

FIGS. 11 and 12 indicate the mechanical properties of self-healing polymers prepared in accordance with certain aspects of the present disclosure through the static tensile tests performed by the dynamic mechanical analysis (DMA). FIGS. 11 and 12 show the stress-strain curves of self-healing polymers before and after removing water molecules presenting within the samples, respectively.

In the case of FIG. 12, the samples are stored in the desiccator set to 22° C. and 17% RH for 72 hours. As shown in FIG. 12, maximum tensile strain at breaking point is improved from 350% (black curve) to 1,150% (orange curve) with increasing of $N_{Zn}/N_{PVA}$ from 0.1 to 0.3. The lower the molar ratio ($N_{Zn}/N_{PVA}$), the higher Young's modulus and tensile strength that results from greater amounts of physical crosslinking based on the ether bonds within the material. On the other hand, the self-healing films with the higher molar ratio of 2.5 or 3.0 tend to show much lower Young's moduli as well as even higher elongations. The higher concentration of zinc ions may interfere with the formation of physical crosslinking between PVA backbone chains during the freezing-thawing process, thereby rendering hydrogels to be soft and lowering Young's modulus.

FIG. 13 shows the Young's modulus (E) obtained from FIGS. 11 and 12 for the self-healing polymers in terms of a molar ratio of zinc and PVA. "Young's modulus" is a mechanical property referring to a ratio of stress to strain for a given material. One way of expressing Young's modulus may be by the expression:

$$E = \frac{\text{(stress)}}{\text{(strain)}} = \frac{\sigma}{\epsilon} = \frac{L_o}{\Delta L} \times \frac{F}{A}$$

where engineering stress is $\sigma$, tensile strain is $\in$, E is the Young's modulus, $L_O$ is an equilibrium length, $\Delta L$ is a length change under the applied stress, F is the force applied and A is the area over which the force is applied. However, as described below, other ways of calculating Young's modulus may also be used. The red and blue circles represent the modulus of the self-healing polymers before and after dehumidifying in the desiccator (22° C./17% RH) for 72 hours, respectively. Two groups of samples similarly show that the moduli exponentially diminish with increasing molar ratio. As can be seen in FIG. 13, the moduli of dehumidified samples are two orders of magnitude higher than those of water-containing samples. While not limiting the present teachings to any particular theory, this phenomenon could be related to the innately soft property of hydrogels that contain high amount of water acting as a plasticizer. The general hydrogels become mechanically harder and stronger as water is removed. This feature could appear in the self-healing polymers provided by certain aspects of the present disclosure in that they are fabricated via freezing-thawing process to form general hydrogels. Besides, the Young's modulus gradually decreases with an increase in the molar ratio of metal ions-ligand. As previously mentioned, the steric hindrance of zinc ions interferes with formation the networks linked covalently by ether bonds during the freezing-thawing process. In addition, most of the zinc ions begin to participate in the formation of Zn-PVA complexes by bonding with hydroxyl groups of PVA so that the number of ether-based covalent bond relatively decreases. With these reasons, the self-healing polymers prepared in accordance with certain aspects of the present disclosure show a decrease in the Young's modulus with an increase of the molar ratio of metal-ligand. Particularly, the Young's modulus in the self-healing polymers shows the following correlation with respect to the molar ratio of metal-ligand:

$$E = A \cdot \exp(-Bf)$$

where E is the Young's modulus and f is the molar ratio between mole number of metal ions and mole number of ligand (polymer). The criteria of A and B to form ultra-fast self-healing polymers may be about 2. As a result, the self-healing polymers have a wide range of Young's modulus by controlling the moisture content and the molar ratio of metal-ligand. This tunability of modulus is based on the formation of polymer networks induced by the coordination bonds between zinc ions and PVA backbones, instead of covalent bonds, thus yielding a potential application of artificial skin or flexible electronics. Furthermore, the Young's modulus of dehumidified self-healing polymers shows a similar range with that of human skin. A yellow box seen in FIG. 13 indicates the modulus range of human skin as discussed in M. J. Adams et al. Friction and lubrication of human skin, Tribology Letters, 26, 239, (2007) and C. Pailler-Matta, et al., "Analysis of adhesive behaviour of human skin in vivo by an indentation test," Tribology International, 39, 12, (2006), the relevant portions of which are incorporated herein by reference.

FIG. 14 represents the brittle-ductile transitions of self-healing polymers based on Zn-PVA complexes via freeze-thaw and dehydration processes. Whereas the tensile strength at a breaking point decreases with an increase in the molar ratio of zinc ions to PVA, the maximum elongation dramatically increases. As discussed above, zinc ions inhibit the formation of covalent bonds (ether bonding) during the freeze-thaw process due to zinc's steric hindrance. In addition, zinc ions form a polymer network including polymer chains cross-linked through coordination bonds with the hydroxyl groups of PVA. This polymer network based on metal-polymer ligand interactions significantly improves the elongational properties of self-healing films. As a result, such a brittle-ductile transition in terms of the molar ratio of metal-ligand is observed via the self-healing polymers as shown in FIG. 14. By comparison, conventional hydrogels, such as pristine PVA hydrogel with no metal ions, formed by the freezing-thawing process demonstrate strong physical crosslinking in conjunction with hydrogen bonds. Thus, pristine PVA hydrogel can be formed by hydrogen bonds, ether bond based covalent bonds, and physical crosslinking. These supramolecular physical bonds within hydrogels contribute to enhancing mechanical properties such as modulus and tensile strength. For this reason, the hydrogels based on physical crosslinking and hydrogen bonds formed via freezing-thawing process show a mechanically strong property and then becomes more brittle as water gradually evaporates. Consequently, this brittle-ductile transition observed in the self-healing polymers prepared in accordance with certain aspects of the present disclosure can be attributed to metal-ligand interactions in the presence of zinc ions.

FIG. 15 is a series of photographs taken while a self-healing polymer system prepared in accordance with certain aspects of the present disclosure is cut and then reattached and healed. FIG. 15 demonstrates that the self-healing polymer comprising PVA and Zn shows an autonomous and ultra-fast self-healing property at ambient conditions and absent slight applied manual pressure, the self-healing occurs without any external stimuli such as heat, light, and solvents. The sample has a molar ratio of PVA to $Zn^{2+}$ of 10:3, which is fabricated by undergoing 3 cycles of the freezing-thawing process, followed by a dehumidification process in the desiccator set to 22° C. and 17% RH for 72 hours. The self-healing time is about 10 seconds, after which the healed sample can be stretched out to over 200% of strain.

FIG. 16 illustrates that self-healing polymer systems comprising PVA and Zn prepared in accordance with certain aspects of the present disclosure demonstrate ultra-high elongation of 4000% under very low strain rate (about 10 mm/min). The self-healing polymer with a molar ratio of PVA to $Zn^{2+}$ of 10:3 is fabricated by undergoing 3 cycles of the freezing-thawing process, followed by a dehumidification process in the desiccator set to 22° C. and 17% RH for 72 hours.

FIG. 17 shows results from a scratch test of a self-healing polymer system prepared in accordance with certain aspects of the present disclosure having a thickness of 300 μm laminated on the 1.1 mm thick glass substrate. The self-healing polymer is fabricated by undergoing 3 cycles of a freezing-thawing process, followed by a dehumidification process in the desiccator set to 22° C. and 17% RH for 72 hours. A scratch is induced by hand scribing using a razor blade through the 300 μm thick film. The damage begins to be self-healed without any interventions or stimuli and the scratch nearly disappears within 5 minutes at room temperature. When the damaged surface is smoothly massaged by a finger, the trace of scratch completely disappears. Therefore, self-healing polymers prepared in accordance with certain aspects of the present disclosure indicate an excellent anti-scratching function applicable to anti-scratch coating for automobiles, constructions, displays, and electronics.

FIG. 18 represents a measurement of the normal adhesive stress of a self-healing polymer system in the form of a self-healing adhesive (SHA) prepared in accordance with certain aspects of the present disclosure. All samples are fabricated by undergoing 3 cycles of a freezing-thawing process, followed by the dehumidification process in the desiccator set to 22° C. and 17% RH for 72 hours. The prepared SHA films have a thickness of 200 μm and are laminated on the 1.1 mm glass with a preload to estimate the property of pressure sensitive adhesive (PSA). The adhesive strength monotonically increases with the preload at first and then shows the saturated value from the preload of about 2 MPa. The adhesive strength of SHA with the preload of 2.55 MPa is about 67.4% higher than that of intrinsic adhesive strength, which indicates the adhesive strength of SHA without any preload. The measured adhesive strength (black circles) are in agreement with the fitting model as the following:

$$\sigma_A = \sigma_A^0 + \sigma_{A,P}^0\left(1 - \exp\left[-\frac{P}{\tau}\right]\right)$$

where $\sigma_A$ is a total adhesive strength, $\sigma^0_A$ is a normal adhesive strength without any preload as an intrinsic material property, $\sigma^0_{A,P}$ is a saturation value of normal adhesive strength with the preload, P is the preload applied to SHA, and r is a relaxation value adhesive strength with the preload. The intrinsic adhesive strength ($\sigma^0_A$) of SHA is extracted as 0.19 MPa from the measured data and then $\sigma^0_{A,P}$ and r are calculated as 0.13 MPa and 0.6 MPa by the fitting of the equation, respectively. Consequently, the form ultra-fast self-healing adhesives prepared in accordance with certain aspects of the present disclosure shows a special characteristic of a pressure sensitive adhesive (PSA) following the above equation.

In addition, the SHAs prepared in accordance with certain aspects of the present disclosure indicate a stronger adhesive strength than that of a commercially available product (3M Scotch Magic® Tape 810) as described in S. Fujii et al., "Pressure-sensitive adhesive powder," Mater. Horiz., 3, 47 (2016) and bio-inspired Gecko-patterned physical adhesive as shown in FIG. 18, as described in S. H. Lee et al., "Scalable and continuous fabrication of bio-inspired dry adhesives with a thermosetting polymer," Soft Matter, 14, 2586 (2018), the relevant portions of both of which are incorporated herein by reference. The adhesive strength of 3M Scotch Magic Tape and Gecko patterned dry adhesive is 0.15 MPa and 0.112 MPa, respectively.

FIG. 19 are photographs observing adhesion properties of a self-healing adhesive (SHA) prepared in accordance with certain aspects of the present disclosure with different substrates. More specifically, the SHAs are based on Zn-PVA complexes formed via the freezing-thawing process of 3 cycles followed by the dehumidification process in the desiccator set to 22° C. and 17% RH for 72 hours. The SHA provides outstanding adhesion to various interfaces such as metal to glass, metal to metal, and metal to plastic. For example, the SHA strengthens its adhesion on the glass due to the presence of coordination bonds.

In certain aspects, the present disclosure thus contemplates a self-healing pressure sensitive adhesive formed of the self-healing polymeric materials, where the adhesive adheres to at least one substrate selected from the group consisting of: glass, plastic, metal, fabric, and biological tissue, such as skin. In certain variations, a bond strength of the PSA with at least one substrate is greater than or equal to about 0.05 MPa without any preload and 0.15 MPa with a preload level of 1.5 MPa. For example, a bond strength may be 0.190±0.006 MPa without any preload, and 0.303±0.006 MPa with a preload of 1.4 MPa. The normal stress of self-healing adhesives is measured as an adhesive strength by FDHT (Larson System Inc) to evaluate the characteristics of pressure sensitive adhesive (PSA) with or without the preload. The self-healing adhesive is laminated onto the metal press with a diameter of 1.5 cm. The metal press is translated vertically downward and then adheres to the substrates with or without the preload in accordance with experimental conditions. The force or stress is then measured while the metal press moves upward and the maximum normal stress is recorded before the press is completely detached from the substrate.

FIGS. 27A-27C show shear strength of self-healing polymers prepared in accordance with certain aspects of the present disclosure as different measures of adhesive strength based on ASTM D1002. FIG. 27A shows a comparison of shear strength versus time for double-sided tape, a commercial pressure sensitive adhesive, and a self-healing polymer prepared in accordance with certain aspects of the present disclosure. FIGS. 27B-27C show how shear strength is measured during testing and the INSTRON™ ultimate tensile machine used. The self-healing polymer with a molar ratio of PVA to $Zn^{2+}$ of 10:3 is fabricated by undergoing 3 cycles of the freezing-thawing process, followed by a dehumidification process in the desiccator set to 22° C. and 17% RH for 72 hours. The shear strength is then measure on the INSTRON™ ultimate tensile machine, with measurements following ASTM D1002. The maximum shear strength of self-healing polymer is about 111.30 kPa compared to the shear strength of a commercially available product (3M Scotch Magic® Tape 810) that has a shear strength of 18.94 kPa and a commercial PSA (3M OCA) having a shear strength of 31.69 kPa. Thus, self-healing polymers prepared in accordance with certain aspects of the present disclosure demonstrate excellent shear strength as a pressure sensitive adhesive.

FIGS. 20A-20B illustrate schematics of chemical structures of a self-healing adhesive (SHA) prepared in accordance with certain aspects of the present disclosure when adhered to a glass substrate comprising silicon oxides. As shown in FIG. 20A, metal-ligand complexes can form the coordination bonds with the ligand sites (Si—O—) provided by the glass (M. Tupy et al. Effect of water and acid-base reactants on adhesive properties of various plasticized poly (vinyl butyral) sheet, J. Appl. Polym. Sci. 127, 3474 (2013), the relevant portions of which are incorporated herein by reference). Therefore, one non-limiting hypothesis is that adhesion between the SHA and glass could be due to the coordination bonds between metal ions within the SHA and ligand sites presenting on the glass surface as seen in FIG. 20B.

FIGS. 21A-21B show self-healing properties of the self-healing adhesives (SHAs) as a pressure sensitive adhesive (PSA) prepared in accordance with certain aspects of the present disclosure, more specifically showing the self-healing property of SHA with respect to adhesive strength. As shown in FIG. 21A, a self-healing adhesive is cut into two pieces and then self-healed from 10 minutes. It is then adhered to a glass substrate with preloading to test adhesion strength. FIG. 21A shows an SHA layer being cut in half, followed by self-healing for 10 minutes at room temperature without any stimuli. This self-healed SHA is then evaluated for adhesive strength with the same method as PSA evaluation demonstrated in FIG. 18. FIG. 21B shows adhesion strength versus preload, both before self-healing and after self-healing. As can be seen, the adhesion strength is very similar for samples tested before and after the self-healing process.

The SHA after self-mending shows the same behavior as the SHA before being damaged following the equation shown in FIG. 21B. A relaxation strength (τ) of the original SHA before damage and self-healed SHA is 0.60 MPa and 0.66 MPa, respectively. As a non-limiting hypothesis, the difference of about 10% in the relaxation strength between original SHA and self-healed SHA could be due to additional preload of about 10% that would be required to reach out to 1/e the adhesive strength in case of the self-healed SHA. In certain aspects, the present disclosure provides criteria for the ratio of two relaxation strengths between original SHA and self-healed SHA to form ultra-fast self-healing adhesives.

FIG. 22 shows a stress-strain curve that represents the self-healing behavior of a self-healing adhesive (SHA) prepared in accordance with certain aspects of the present disclosure. The SHA with the molar ratio of PVA to $Zn^{2+}$ of 10:3 is fabricated by undergoing 3 cycles of the freezing-thawing process, followed by a dehumidification process in the desiccator set to 22° C. and 17% RH for 72 hours. An originally undamaged film has a maximum elongation of 1107% in DMA test. Another film fabricated at the same conditions is cut into two pieces and placed in contact with each other through damaged surfaces. After healing at room temperature for about 10 minutes without any interventions or stimuli, aside from an optional application of a pressure of less than or equal to about 0.5 MPa, optionally less than or equal to about 0.05 MPa, the joined film sustains about 1056% of strain with a healing efficiency of about 95% via stretching test in DMA. The damage began to be self-healed and the maximum elongation is nearly recovered up to 90% of that of the original state before any damage. This behavior is believed to be attributable to metal-ligand coordination bonds in the polymer matrix.

FIGS. 23A-23C show sealing performance and durability of adhesive joints formed from self-healing adhesive (SHA) prepared in accordance with certain aspects of the present disclosure. A 500 μm thick glass slide and the glass vials are filled with deionized water, isopropyl alcohol (IPA), acetone, dimethylformamide (DMF), and benzene, which are sealed by an SHA film. The setup is shown in FIG. 23A. After sealing for 5 minutes, the glass slide side is placed on the bottom and then stored for 15 days. As shown in comparing FIGS. 23B and 23C, the sealed SHA has excellent solvent resistance: bonded bottles are filled with water, IPA, acetone, DMF, and benzene and left to stand for 15 days without any leakage. This indicates that the SHA has good solvent resistance and is particularly suitable for use as a leak-free sealant. In certain aspects, the present disclosure thus contemplates a self-healing pressure sensitive adhesive that is stable in the presence of and resistant to solvent attack, namely solvent resistant. In other aspects, the present disclosure thus contemplates a self-healing pressure sensitive adhesive that is stable in the presence of and resistant to water. These self-healing polymeric materials can be applied when the substrate has a solvent or water disposed on it. Thus, when the self-healing polymeric materials are pressure sensitive adhesives, they can be used to bond wet substrates together.

FIG. 24 represents the spectrum of optical transmittance for a self-healing adhesive (SHA) prepared in accordance with certain aspects of the present disclosure. The SHA film shows the transmittance of about 78% due to the diffuse reflection induced by its rough surface. However, a SHA film sandwiched between two 1.1 mm thick glass substrates has a transmittance of about 92%, which is nearly similar with that of bare glass as seen in FIG. 24. The measured haze is about 0.6%, thus yielding an optically transparent self-healing polymer. This optically transparent property of the self-healing polymer/SHA is due to the presence of metal-ligand coordination bonds in the polymer matrix. The steric hindrance of zinc ions inhibits the formation of ether-based covalent bonds during the freezing-thawing process. The pristine PVA hydrogels associated with covalently crosslinked networks and hydrogen bonds without any metal ions indicate an optically opaque property. Therefore, an addition of zinc ions to PVA ligand can result in an increase in the density of coordination bonds, which in turn, improves optical transparency.

In certain aspects, the self-healing polymer system may be optically transparent or transmissive to electromagnetic radiation in the visible spectrum, for example, wavelengths of light ranging from greater than or equal to about 380 nm to less than or equal to about 780 nm. By transparent, it is meant that the self-healing polymer system is transmissive for a target range of wavelengths of electromagnetic energy, for example, in the visible wavelength ranges. The self-healing polymer systems of the present disclosure are capable of transmitting select portions of the electromagnetic spectrum and thus may be transparent or semi-transparent. Transparency may generally encompass semi-transparency, and can be understood generally to mean that greater than or equal to about 50% of a predetermined target wavelength or range of wavelengths (which may be polarized or non-polarized) of light/energy pass through the self-healing polymer system. In certain variations, greater than or equal to about 50% of a target wavelength (or range of wavelengths) passes through the self-healing polymer system, optionally greater than or equal to about 60%, optionally greater than or equal to about 70%, optionally greater than or equal to about 75%, optionally greater than or equal to about 80%, optionally greater than or equal to about 85%, optionally greater than or equal to about 90%, and in certain variations, optionally greater than or equal to about 92% of target wavelength(s) pass through the self-healing polymer system of the present disclosure.

FIG. 25 shows electrical conductivity of a self-healing adhesive (SHA) prepared in accordance with certain aspects of the present disclosure. The SHA is an ionomer based on metal-ligand coordination bonds. The inverse of measured electrical resistance (black circles) is in good agreement with the fitting model (red line) based on the percolation theory which can be expressed as the following:

$$R^{-1} = R_0^{-1}(f - f_C)^r$$

where $R^{-1}$ is an inverse of electrical resistance of self-healing adhesive, $R^{-1}_0$ is the maximum value of an inverse of electrical resistance for self-healing adhesive, f is the molar ratio of zinc to PVA, $f_c$ is the percolation threshold, and r is a critical exponent. In certain aspects, the present disclosure contemplates self-healing polymer systems having electrically conductive property satisfies the following properties equation that indicates the property of ionomer: $0<f_c<0.1$ and $1<r<2$. This ionomeric behavior of the SHA can provide with the potential application of ionic conductor, polymeric electrolytes, and sensors.

The self-healing polymer system of the present disclosure may be electrically conductive and have a sheet resistance of less than or equal to about 10 MΩ/square, optionally less than or equal to about 9 MΩ/square, less than or equal to about 8 MΩ/square, and in certain variations, optionally less than or equal to about 7 MΩ/square. This ionomer-like behavior of self-healing polymers provided by the present disclosure makes them suitable for use as stretchable sensors and solid electrolytes.

Moreover, the self-healing adhesives (SHAs) prepared in accordance with certain aspects of the present disclosure are a potential application of novel self-healing materials, which can repair the adhesive joints and autonomously heal cracks after being damaged. Specifically, as a special class of polymeric adhesives, pressure sensitive adhesive (PSA) with self-healing ability have widespread applicability. The PSA is component used in many areas, including in the fields of displays, flexible packaging, and electronics. It is a kind of quasi-reversible adhesive, which is able to adhere to various substrates when pressure is applied. The PSA shows a viscoelastic property due to its low glass transition temperature, so that it keeps tacky and soft characteristics. However, most conventional PSAs tend to be weak and susceptible to mechanical, chemical, and thermal damage. Thus, it would be desirable to have robust, damage resistant PSA with self-healing abilities. As noted above, the ultra-fast self-healing polymers based on dynamic and reversible metal-ligand interactions provided by certain aspects of the present disclosure are particularly well suited for a variety of technologies and commercial applications involving PSAs.

In certain aspects, the present disclosure contemplates a self-healing polymeric material that comprises a polymer network comprising one or more ligands having a transition metal ion coordination site. The self-healing polymeric material also comprises a transition metal ion distributed in the polymer network and capable of interacting with the transition metal ion coordination site via a coordination bond. Such a self-healing polymeric material may satisfy the following conditions:

$$E_a = a \cdot f + b; \text{ and } a = \left(\frac{\partial E_a}{\partial f}\right) < 0,$$

where $E_a$ is an activation energy, f is a molar ratio of number of moles of transition metal ion to moles of ligands, a is a slope of activation energy versus the molar ratio (for example, where the slope is linearly fitted) that ranges from greater than or equal to about 1 to less than or equal to about 5, b is a y-intercept of activation energy versus the molar ratio of metal-ligand. "b" thus represents the activation energy of self-healing polymers without any metal ions with a value in excess of 0.2 eV. The polymer network is capable of self-healing a mechanical crack or cut in less than or equal to about 30 minutes at ambient conditions.

In certain other aspects, such a self-healing polymeric material may have a Young's modulus represented by:

$$E = A \cdot \exp(-Bf),\ 11 < -B\left(= -\frac{\partial(\log E)}{\partial f}\right) < 20, \text{ and } A > 1,$$

where E is the Young's modulus and f is a ratio of moles of transition metal ion to moles of ligands of the polymer network.

In one aspect, the self-healing polymeric material has a Young's modulus (E) of greater than or equal to about 0.01 kPa to less than or equal to 100 kPa, optionally greater than or equal to about 10 kPa to less than or equal to 100 kPa. In certain other aspects, the self-healing polymeric material is cross-linked and has a Young's modulus of greater than or equal to about 1 kPa to less than or equal to 100 MPa, optionally greater than or equal to about 1 kPa to less than or equal to 50 MPa.

In other variations, the present disclosure contemplates a self-healing pressure sensitive adhesive formed of such a self-healing polymeric material, where a total adhesive strength ($\sigma_A$) of the self-healing pressure sensitive adhesive is represented by:

$$\sigma_A = \sigma_A^0 + \sigma_{A,P}^0\left(1 - \exp\left[-\frac{P}{\tau}\right]\right),$$

where $\sigma^0_A$ is a normal adhesive strength of the self-healing pressure sensitive adhesive without any preload, $\sigma^0_{A,P}$ is a saturation value of normal adhesive strength of the self-healing pressure sensitive adhesive with a preload, P is a preload applied to the self-healing pressure sensitive adhesive, and r is a relaxation value adhesive strength with the preload. In certain aspects, r is greater than or equal to about 0.1 and less than or equal to about 1.

In other aspects, a ratio of r after self-healing to an original τ before any damage is represented by the following:

$$\frac{\tau_{self-healed}}{\tau_{original}} < 0.2,$$

where $\tau_{original}$ is a relaxation strength before damage and $\tau_{self-healed}$ is a relaxation strength after self-healing.

In one aspect, the self-healing pressure sensitive adhesive may have a total adhesive strength ($\sigma_A$) of the self-healing pressure sensitive adhesive is greater than or equal to about 0.1 MPa to less than or equal to about 5 MPa, optionally greater than or equal to about 0.01 MPa to less than or equal to 1 MPa.

In yet other aspects, the self-healing polymeric material has ionomeric properties represented by the following $$R^{-1} = R_0^{-1}(f - f_C)^r,$$

where $R^{-1}$ is an inverse of measured electrical resistance, $R^{-1}{}_0$ is a maximum value of an inverse of electrical resistance for self-healing adhesive, f is a ratio of moles of transition metal ion to moles of ligands of the polymer network, $f_c$ is a percolation threshold and is greater than 0 and less than or equal to about 0.1, and r is a critical exponent that is greater than or equal to about 1 to less than or equal to about 2.

In various other aspects, the present disclosure provides a method of making a self-healing polymeric material. The method may comprise mixing a polymer precursor and a precursor comprising a transition metal together to form a mixture of a polymer having one or more ligands with at least one transition metal ion coordination site and a transition metal ion distributed in the polymer. The method further includes freezing the mixture and thawing the mixture. This forms a self-healing material comprising a polymer network having the transition metal ion distributed therein. At least one transition metal ion coordination site on one or more ligands of the polymer network reacts with the transition metal to form a reversible coordination bond. The self-healing material is capable of self-healing a mechanical crack or cut in less than or equal to about 30 minutes at ambient conditions in an absence of external stimuli.

In certain aspects, at least three cycles of the freezing and thawing are conducted. In certain other aspects, the method further comprises conducting a water removal process on the self-healing material after the thawing. An activation energy of the self-healing material is controlled by an amount of water removed in the water removal process. In yet other aspects, the methods may further comprise subjecting the self-healing material to a temperature of greater than or equal to about 30° C. to less than or equal to about 60° C. after the thawing.

It should be appreciated that while the discussion above pertains to variations that involve reversible metal-ligand bonding, the mechanism of self-healing can be expanded to include weak covalent and ionic bonds that can be broken and reformed under mild conditions. In one example, thiol-metal bonds can be formed spontaneously (e.g., —S═Au, —S═Ag), which is generally considered to be a type of covalent bond. Such bonds are formed by first dissociating S—H bonds, which are favored in alkaline environment, and inhibited under acidic conditions. Therefore, it is expected that the formed thiol-metal bond could be broken in acidic environment. When thiol-moieties are included on polymer chains, and gold (Au) nanoparticles included in the polymer matrix, self-healing can be established by the breaking and re-forming of the thiol-gold bonds. Thus, the present disclosure contemplates not only self-healing polymer systems, but also self-healing polymeric composite systems having a plurality of particles, such as metal particles, distributed therein.

Example

Ultra-fast self-healing polymers based on Zn-PVA complexes are created by using a freezing-thawing method described in C. Hassan et al., "Structure and Applications of poly(vinyl alcohol) hydrogels produced by conventional crosslinking or by freezing/thawing methods," *Adv. Polym. Sci.* 153, 37 (2000)), the relevant portions of which are incorporated herein by reference. Thus, 10 g of PVA (Sigma-Aldrich, $M_w$ of approximately 89,000 g/mol, >99% hydrolysis) is dissolved in 100 ml of deionized water while vigorously stirring with a magnetic bar at 90° C. for 1 hour. The mixed solution is cooled to room temperature. For metal-ligand complexation, zinc nitrate hexahydrate, $Zn(NO_3)_2.6H_2O$, is chosen as the $Zn^{2+}$ source due to its good solubility with water, as well as thermal stability in the solid state. Zinc nitrate hexahydrate (Sigma-Aldrich, purum p.a., crystallized>99% grade, $M_w$~297.49 g/mol) is added into 10 wt. % PVA solution prepared with molar ratios ($N_{PVA}$:$N_{Zn}$) of 10:1, 10:1.5, 10:2, 10:2.5, and 10:3 followed by additional mixing using a magnetic bar at 25° C. for 1 hour. Each of these as-prepared homogeneous aqueous solutions is poured into a polycarbonate petri-dish of desired dimension and then frozen in a refrigerator at −15° C. for 24 hours. The fully frozen samples are thawed out at room temperature for 3 hours. This freezing-thawing process is repeated three times (in three cycles), resulting in the formation of Zn-PVA complexed hydrogels. Finally, over five sets of the same samples are prepared as ones prepared via aforementioned procedures to evaluate one material characteristic. In order to investigate the effect of temperature on self-healing efficiency, some sets of samples are evaluated upon heating at 30° C., 40° C., 50° C., and 60° C. as compared to ambient conditions (room temperature, which is typically about 23° C.).

Likewise, other sets of samples are placed into a desiccator to remove residual water existing within the self-healing polymers and increase in Zn-PVA complexes by reducing in Zn—$H_2O$ complexes. The observed humidity and temperature inside the desiccator are 17±2% RH and 22±1° C., respectively. These dehumidified samples are prepared to analyze the effect of moisture on self-healing efficiency. The self-healing efficiency is evaluated by measuring a time showing the elongation of 200% without any fractures in healed region of each sample when self-recovered under given conditions. The sample has an initial length of 10 mm, which is then elongated by a homemade stretching machine. Dynamic mechanical analysis measurement is carried out on dynamic mechanical analyzer TA instrument RSA3 (strain rate of about 0.2 mm/sec) to evaluate mechanical properties such as Young's modulus, tensile strength, and maximum elongation of the self-healing polymers. The normal adhesive strength is measured by FDHT (Larson System Inc) to evaluate the characteristics of pressure sensitive adhesive (PSA) with the preload to samples. Optical transmittance and haze are evaluated by Agilent Cary 6000 UV/Vis Spectrophotometer along with Ocean Optics spectrophotometer. The shear strength is measured by an INSTRON™ ultimate tensile machine used with the measurement conducted in accordance with the standards set forth in ASTM D1002, the relevant portions of which are incorporated herein by reference.

Thus, the present disclosure contemplates a spontaneous self-healing polymer in which a reversible network of dynamic metal-ligand interactions can be strategically manipulated by activation energy control. The self-healing efficiency of the materials described herein is directly related to control of activation energy, which can be achieved by adjusting the moisture content or water levels within the product. Furthermore, the mechanical and adhesive properties of the self-healing polymeric materials can be tuned by varying not only material parameters such as the ligand/metal ratio, molecular weight of polymer, and degree of hydrolysis of polymer, but also process parameters during formation involving the number of freezing-thawing cycles, temperature, and humidity. Following mechanical damage, these dynamic coordination bond-mediated elastomers show excellent self-healing ability under ambient conditions without any intervention. Furthermore, in alternative aspects, self-healing can be used in other systems that include weak covalent and ionic bonds that can be broken and reformed under mild conditions, for example, gold and thiol bonds. The self-healing polymeric materials provided by certain aspects to the present disclosure may be used in a variety of non-limiting applications, including electronics, displays, wearable devices, vehicles, robotics, manufacturing, construction industry, medical devices and surgical applications, flexible packaging, toys, sensors, electrolytes (e.g., for energy storage and conversion devices), and the like. In certain aspects, the self-healing polymeric materials may be molded to form a structural component or may be used to form layers or coatings disposed over other materials. As noted above, the self-healing polymeric materials can form pressure-sensitive adhesives that can bond or adhere two substrates together.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A self-healing polymeric material comprising:

a hydrogel polymer network comprising poly(vinyl alcohol) (PVA) that defines one or more ligands having a transition metal ion coordination site comprising hydroxy groups;

a transition metal ion distributed in the polymer network and capable of interacting with the transition metal ion coordination site via a reversible coordination bond; and water, wherein a first complex is defined for the transition metal ion and the transition metal ion coordination site, and a second complex is defined for the transition metal ion and water, wherein a ratio of the first complex to the second complex is greater than or equal to about 1:1 and less than or equal to about 5:1 and the polymer network is capable of self-healing a mechanical crack or cut in less than or equal to about 30 minutes at ambient conditions.

2. The self-healing polymeric material of claim 1, wherein the transition metal ion is a zinc ion ($Zn^{2+}$).

3. The self-healing polymeric material of claim 1, wherein the polymer network is capable of self-healing a mechanical crack or cut in less than or equal to about 1 minute at ambient conditions.

4. The self-healing polymeric material of claim 1, wherein the polymer network further comprises an additive selected from the group consisting of: a plasticizer, a crosslinker, a nanoparticle, and combinations thereof.

5. The self-healing polymeric material of claim 1, wherein the hydrogel polymer network has a Young's modulus (E) of greater than or equal to about 0.01 kPa to less than or equal to 100 kPa.

6. The self-healing polymeric material of claim 1, wherein a ratio of moles of hydroxy groups in PVA ($N_{PVA}$) to moles of zinc ions ($N_{zn}$) is greater than or equal to about 10:5 to less than or equal to about 20:1.

7. The self-healing polymeric material of claim 1, further comprising water, a first complex of the transition metal ion and the transition metal ion coordination site, and a second complex of the transition metal ion and water, wherein a ratio of the first complex to the second complex is greater than or equal to about 1:1 and less than or equal to about 4:1.

8. The self-healing polymeric material of claim 1 capable of an elongation under strain of greater than or equal to about 100% after self-healing of the mechanical crack or cut.

9. The self-healing polymeric material of claim 1, having a transmissivity of greater than or equal to about 70% for electromagnetic radiation wavelengths of greater than or equal to about 380 nm to less than or equal to about 780 nm.

10. The self-healing polymeric material of claim 1, having a sheet resistance of less than or equal to about 10 MΩ/square.

11. A self-healing pressure sensitive adhesive formed of the self-healing polymeric material of claim 1, wherein the self-healing pressure sensitive adhesive is capable of adhering to at least one substrate selected from the group consisting of: glass, plastic, metal, fabric, and biological tissue.

12. The self-healing pressure sensitive adhesive of claim 11 having a bond strength with the at least one substrate of greater than or equal to about 0.05 MPa without any preload and 0.15 MPa with a preload level of 1.5 MPa.

13. The self-healing pressure sensitive adhesive of claim 11 being water-resistant and solvent-resistant.

14. The self-healing pressure sensitive adhesive of claim 11 having a maximum shear strength of greater than or equal to about 100 kPa.

15. A device incorporating the self-healing polymeric material of claim 1, wherein the device is selected from the group consisting of: an electronic device, a display, a wearable device, a vehicle, a robot, manufacturing equipment, construction equipment, a medical device, packaging, a toy, a sensor, and an energy conversion or storage device.

16. A method of making a self-healing polymeric material, the method comprising:

mixing a polymer precursor, a precursor comprising a transition metal, and water together to form a mixture of a polymer comprising poly(vinyl alcohol) (PVA) having one or more ligands with at least one transition metal ion coordination site comprising hydroxy groups and a transition metal ion distributed in the polymer;

freezing the mixture; and thawing the mixture, so as to form a self-healing material comprising a hydrogel polymer network having the transition metal ion distributed therein, wherein the one or more ligands with at least one transition metal ion coordination site comprising hydroxy groups of the hydrogel polymer network reacts with the transition metal ion to form a reversible coordination bond, wherein a first complex is defined for the transition metal ion and the transition metal ion coordination site, and a second complex is defined for the transition metal ion and water, wherein a ratio of the first complex to the second complex is greater than or equal to about 1:1 and less than or equal to about 5:1, and wherein the self-healing material is capable of self-healing a mechanical crack or cut in less than or equal to about 30 minutes at ambient conditions in an absence of external stimuli.

17. The method of claim 16, wherein at least three cycles of the freezing and thawing are conducted.

18. The method of claim 16, further comprising conducting a water removal process on the self-healing material after thawing, wherein an activation energy of the self-healing material is controlled by an amount of water removed in the water removal process.

19. The method of claim 16, further comprising subjecting the self-healing material to a temperature of greater than or equal to about 30° C. to less than or equal to about 60° C. after the thawing.

* * * * *